United States Patent [19]

Pirson et al.

[11] 3,943,436

[45] Mar. 9, 1976

[54] LINE INTEGRAL METHOD OF MAGNETO-ELECTRIC EXPLORATION

[76] Inventors: Sylvain J. Pirson; Jacques E. Pirson, both of 8608 Mesa Drive, Austin, Tex. 78759

[22] Filed: Jan. 21, 1974

[21] Appl. No.: 435,120

[52] U.S. Cl. .................................................. 324/8
[51] Int. Cl.² ........................ G01V 3/00; G01V 3/08
[58] Field of Search ........................... 324/1, 4, 6, 8

[56] References Cited
UNITED STATES PATENTS

| | | | |
|---|---|---|---|
| 1,794,666 | 3/1931 | Bieler et al. | 324/6 |
| 2,606,229 | 8/1952 | Brewer et al. | 324/8 |
| 3,808,519 | 4/1974 | Lemercier et al. | 304/8 X |

FOREIGN PATENTS OR APPLICATIONS

| | | | |
|---|---|---|---|
| 136,536 | 3/1950 | Australia | 324/8 |

*Primary Examiner*—Gerard R. Strecker

[57] ABSTRACT

A method of exploration for deposits of oil, gas and of other minerals in the earth including geothermal energy, which is based on the existence of electrotelluric currents that are generated spontaneously by such deposits because of the geochemical modifications caused by their presence within rocks in the proximity of such deposits, which method consists in measuring the magnetic perturbations created by said electrotelluric currents in the normaly existing earth magnetic field.

When such electrotelluric currents exist, closed line-integrals of the earth magnetic field performed at or near the earth's surface so not vanish and the residual values of such integrals are a direct function of the magnitude and of the polarity of the electrotelluric current flux densities generated by the underground mineral deposits sought.

14 Claims, 16 Drawing Figures

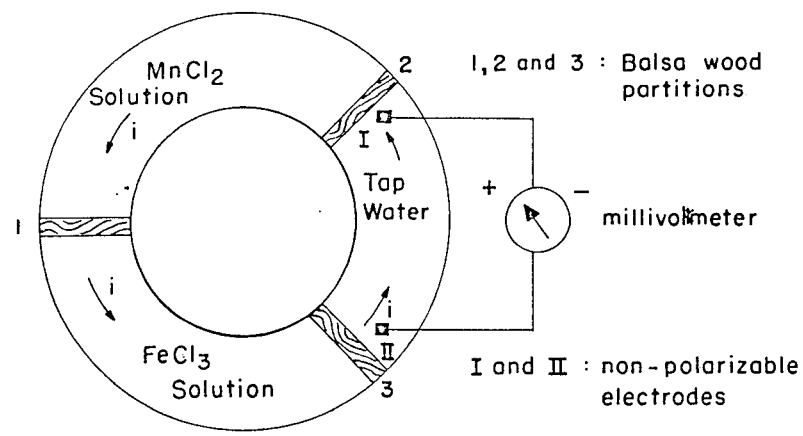
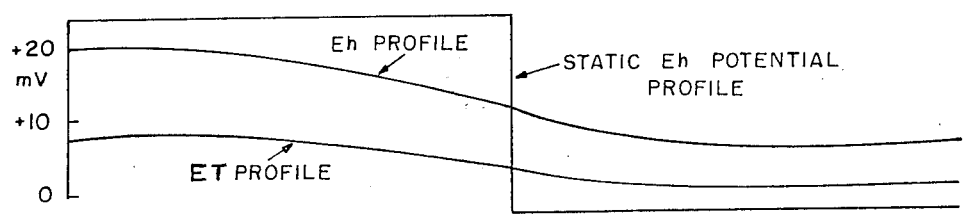
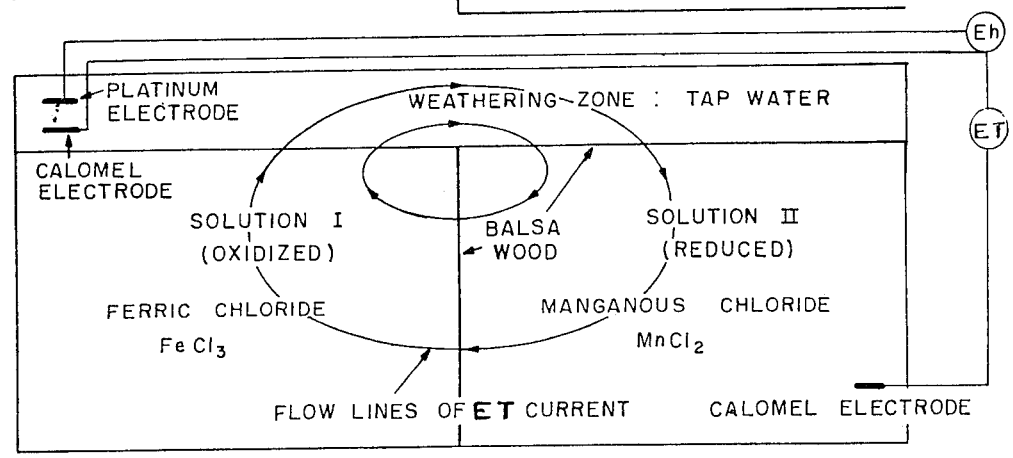

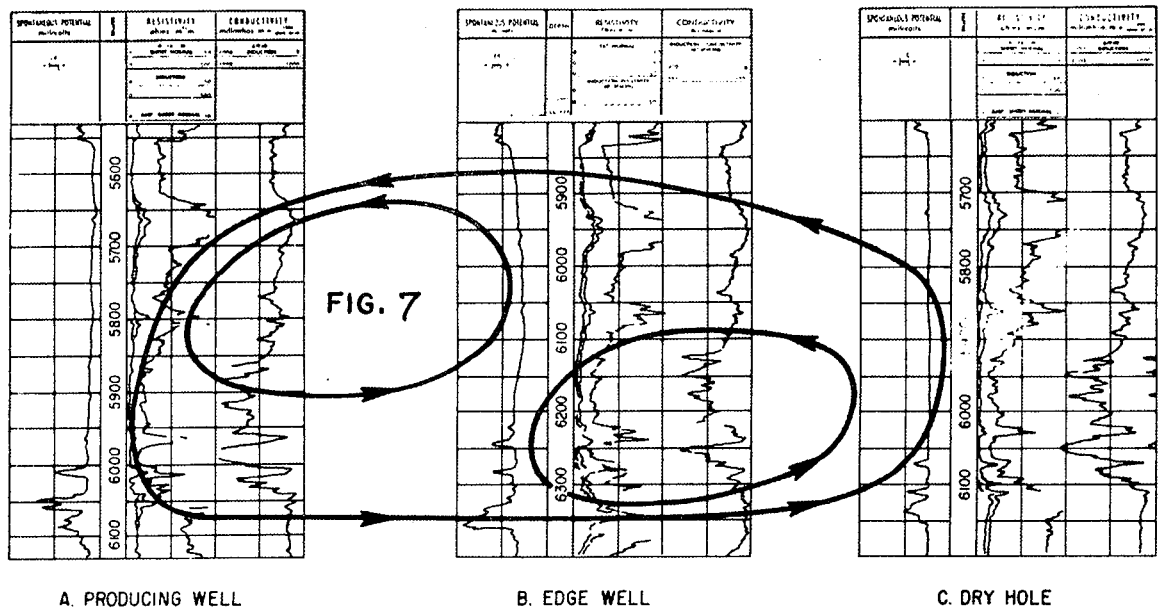
A. PRODUCING WELL  B. EDGE WELL  C. DRY HOLE
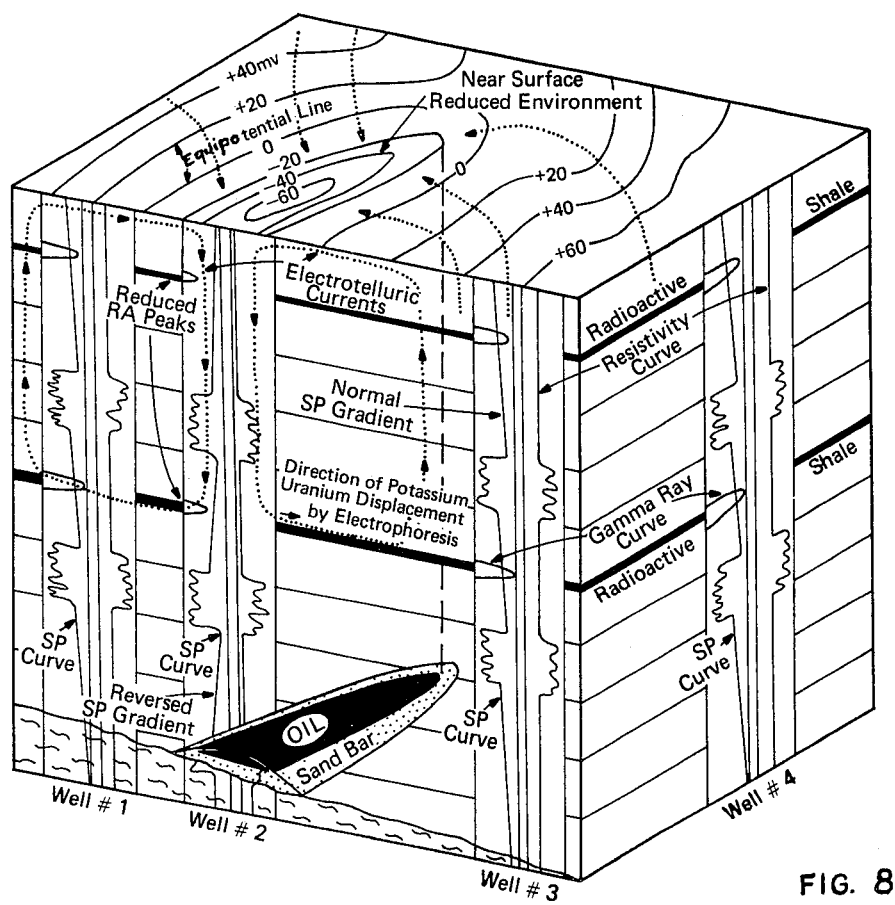
FIG. 8

Contour Interval: 10 ma/acre ns3,943,436

LINE INTEGRAL METHOD OF MAGNETO-ELECTRIC EXPLORATION

BACKGROUND OF THE INVENTION

1. Field of the Invention

This invention relates to methods and apparatus for exploring the subsurface of the earth for valuable deposits of oil and/or gas, of other minerals and of geothermal energy resources by using some direct manifestation of the presence of such deposits, namely perturbations in the earth magnetic field created by the electro-telluric currents generated spontaneously by such deposits.

2. Description of the Prior Art

There are numerous exploration systems that have been proposed for locating in the earth deposits of oil and/or gas, of other minerals and of geothermal energy resources by outlining favorable geologic features such as structural (deformational) and/or stratigraphic (sedimentational) regions of entrapment or accumulation on the basis of favorable statistical association of such deposits with the said geologic features. However, there is no satisfactory system of exploration for such deposits that utilizes direct observation of physical and chemical properties, and of modifications of the lithologic environment in which such deposits are found, and in which the mode of migration and of accumulation of the minerals was responsible for geophysicochemical modifications created by the mere presence of such deposits.

Some exploration techniques, classed as geochemical prospecting, that use analysis of soil-air for hydrocarbon traces or that use the analysis of actual soils for the presence of absorbed light and heavy hydrocarbons, have been and they are still practiced with moderate success, but in view of the near surface nature of these observations, many disturbing factors are present in the measurements. Soil-air and soil analysis have not given the high success ratio in exploring for oil and/or gas that would be expected from a direct discovery technique and this geochemical method is not generally accepted as a satisfactory exploration method.

Geochemical exploration for minerals has generally proved satisfactory for discovering mineral deposits at shallow depths (of the order of 1000 feet), but for greater depths it has proved of little value.

Exploration for geothermal energy resources is in its infancy and no satisfactory method is known up to this point in time which can pin-point superheated steam reservoirs at depths of one to two miles, or can delineate in the subsurface the boundaries of geothermal energy resources of magmatic origin.

Magneto-electric exploration is not to be confused with the Hayes patents of reference (U.S. Pat. No. 2,368,217 and U.S. Pat. No. 2,368,218) because these patents teach only the methods of detecting the electric currents generated by oil and gas fields by measuring the omhic potential drop effects at the surface of the earth and without giving a satisfactory explanation for the origin of said currents nor for their flow patterns. Nor should magneto-electric exploration be confused with the magneto-telluric method of Cagniard (U.S. Pat. No. 3,514,693) which records continuously the micropulsations of both the related magnetic and electric fields of the earth at one point, or simultaneously at two points in order to make deep crustal studies of the earth to depths of 50 to 100 Km for the purpose of determining rock resistivities at such depths. In magneto-telluric studies it is necessary to measure two magnetic field components in the direction perpendicular to the direction of the measured electric field. When two stations are used, this requires at least a four trace continuous recorder. In addition a time-maker needs to be recorded. While the method of Cagniard may be used for shallower depths of investigation it is useless for the finding of oil directly, for all it is able to measure is earth resistivity as a function of depth on a very coarse scale and it lacks the fine vertical resolution required to find oil.

SUMMARY OF THE INVENTION

The concept of magneto-electric exploration and its subsequent verification by field tests established that the vertical electro-telluric currents generated in the earth by the "fuel cell" effect of oil and gas accumulations, of sulfide ore deposits and of geothermal heat sources give rise to anomalies in the static earth magnetic field.

The theory that explains the origin of vertical electro-telluric currents will be reviewed in some details.

That there should be a relation between such electro-telluric currents and perturbations in the static earth magnetic field should be evident by virtue of the well known Maxwell's equations of electro-magnetism. However, we deal here with a simpler case, namely steady state conditions in both the electric current and in the magnetic field. This makes the relationship quite simple and it is therefore possible to deduce the direction and magnitude of vertical electro-telluric currents from anomalies represented by maps of the earth magnetic field, that this be by the total vector, or by the horizontal component of the earth magnetic field, or that it was measured on the surface of the earth or by an airborne magnetometer (flux-gate or proton-precession type) does not matter. For magneto-electric exploration it is desirable to be able to make readings to an accuracy of one gamma ($10^{-5}$ Oersted), but maps with contour intervals of 10 to 20 gammas are readily transformed into vertical electric current intensity maps and at any desired depth below the earth's surface. The depth of downward projection of the anomalies is selected to be approximately that at which the electrochemical sources or "fuel cells" are expected.

In the data processing routine used in magneto-electric exploration, the effects of the basement rock structure and of rock magnetic polarization are removed and only the residual magnetic part related to vertical electric currents remains. The napping and contouring of the polarity and of the intensity of such currents therefore depicts the subsurface fuel cell anomalies and thereby outlines or delineates the probable areal extent and the probable depth at which economic mineral accumulations may be found.

The processing of geomagnetic data may be made from already existing contoured magnetic maps but it is also possible to computer-process directly the digital or analogue continuous recordings obtained from an airborne or truckborne magnetometer and to computer-plot contoured maps of the vertical electro-telluric currents at various desired depths.

Mangeto-electric interpretation of magnetic maps derives very rapidly the distribution of vertical electro-telluric currents present in an area, both in intensity and in direction. These electric currents are the same that are measured by Electro-telluric Exploration at the surface of the earth. Hence, the results of Magneto-electric (ME) interpretation may readily be checked by surface Electro-telluric (ET) surveys. Accordingly, the amount of electro-telluric field work required for checking a magneto-electric discovery is considerably reduced in those areas that have already been surveyed magnetically. This applies to land as well as to off-shore operations.

Magneto-electric surveys may also be made by truck-mounted land surveying instruments or by airborne instruments using appropriate cross-flight patterns in which instruments the directional magnetic sensor is constantly oriented in the direction of travel so as to provide means for a line integration of the measured magnetic intensities around closed profiles along adjacent grids and in sufficient number so as to cover the desired area of investigation.

Magneto-electric surveys may further be made on the surface of the ground, or for that matter at sea, by making selected ground spot measurements of the horizontal component of the earth magnetic field (in total value or in value relative to a base station) the measurements for the spot locations being so selected as to obtain a sequence of depth of investigation points substantially all of the same magnitude so as to obtain a subsurface map depicting the vertical electro-telluric current flux, in magnitude and in sign at that depth, and thereby delineate subterranean accumulations of oil, gas, geothermal energy, sulfide ore, and the like, which are known to generate electro-telluric currents.

If the areas to be explored are sufficiently restricted in areal extent that it is feasible to assume that within this area there are no substantial variations in the declination of the Magnetic North from the True North nor in the value of the angle of inclination of the total earth magnetic field vector from the horizontal plane, then an instrument that measures the total earth magnetic field is suitable for the purpose of Magneto-electric surveys. Such instruments are generally known as proton magneto-meter or optically pumped vapor magneto-meters. Acceptable variations less than substantial would be when they are less than one tenth of one degree of arc in declination or in inclination.

Broadly stated, our invention includes the steps of measuring at points along one or more closed continuous profile lines on the surface of the earth, or above it, or below the surface of the oceans, magnetic field perturbations in the earth magnetic field that are induced at least in part by the natural electric currents associated with oil- and/or gas-bearing formations, or with other valuable minerals such as sulfide ore-bodies, or with geothermal steam energy resources.

It is, therefore, an object of the present invention to provide a Magneto-electric exploration method which utilizes the naturally occurring electro-telluric currents and their induced perturbation in the earth's magnetic field intensity whether in the total vector or in the horizontal component of the earth's magnetic field, and to provide methods for isolating and for separating such perturbations in intensity and in polarity in order to deduce from such perturbations the extent and the approximate depth of oil- and/or gas-bearing formations, or of other mineral deposits, or of geothermal energy resources.

It is another object of our invention to provide a Magneto-electric exploration method wherein the subsurface productive limits of oil and/or gas fields, of other mineral deposits, or of geothermal energy resources may be determined from one or more closed-line integrations of the earth magnetic field measured along designated profile lines, closed upon themselves.

It is a further object of our invention to provide a Magneto-electric exploration method for oil and/or gas fields, for other mineral deposits, and for geothermal energy resources wherein it is possible to distinguish between deep and shallow effects of superimposed electro-telluric current sources and to provide means for separating and identifying such effects and to determine the variations with depth of the electro-telluric currents flux densities.

It is still another object of our invention to provide a Magneto-electric exploration method which may be described as of a "single shot" type by enclosing by means of a single continuous closed profile of magnetic measurements a sufficiently large area of the earth's surface so as to determine whether or not such an area is economically petroliferous to a depth at least equal to the square root of the area so enclosed and so as to provide a spot test procedure for the purpose of evaluating drill sites in advance of drilling, leasing or other type of investment.

It is still a further object of our invention to provide a Magneto-electric exploration method which utilizes the naturally occurring electro-telluric currents generated by subterraneous accumulations of oil and/or gas, by other mineral deposits, and by geothermal energy resources to the exclusion of other extraneous sources of currents in the earth such as caused by variable magneto-telluric currents, by stray industrial currents, by corrosion currents, by cathodic protection currents, by electro-kinetic currents caused by water infiltration and flow in near surface porous and permeable rocks, etc., and to provide means for eliminating such variable effects on the desired results.

An additional object of our invention is to provide a direct detection method for oil and/or gas fields, for mineral deposits and for geothermal energy resources by the magneto-electric reinterpretation of existing ground and/or airborne magneto-meter surveys.

A further additional object of our invention is to provide a direct detection method for oil and/or gas fields, for mineral deposits, and for geothermal energy resources by surveying prospective areas for such deposits by means of a total magnetic field sensor or by means of a directional magnetic field sensor of the flux-gate type constantly oriented in the direction of travel either on land, at sea or in the air, according to designated travel paths or flight patterns so as to generate successive and adjacently closed-grid patterns and thus permit the evaluation of the line-integral of the measured magnetic field strength around each closed grid, and thereby evaluate the strength and polarity of the electro-telluric currents that are generated by such deposits.

Still, an additional object of our invention is to provide a direct detection method for oil and/or gas fields, for mineral deposits, and for geothermal energy resources by making selected ground spot measurements of the total or of the horizontal component of the earth magnetic field (of the total vector force or relative to a base station) around a series of closed profiles, successively enclosing larger and larger areas at the surface of the earth so as to obtain a sequence of depths of investigation that are gradually larger and larger so as to obtain a vertical sounding of the electro-telluric current flux density, in magnitude and in sign, and thereby ascertain the depth and intensity of various successively deeper formations as potential producers of oil and/or gas, of other minerals or of geothermal energy resources.

Yet, a further additional object of our invention is to provide a Magneto-electric method of exploration for oil and/or gas fields, for mineral deposits or for geothermal energy resources by making selected ground-spot measurements of the total earth magnetic field or the horizontal component of the earth magnetic field (of the total vector or relative to a base station) around a series of closed profiles and enclosing adjacent and substantially equal areas at the surface of the earth so as to obtain a sequence of depths of investigation substantially all of the same magnitude and so as to obtain a map of the vertical electro-telluric current flux intensities in magnitude and in sign substantially at a constant depth of investigation and thereby delineate at that depth productive areas of oil and/or gas, of other minerals, and of geothermal energyy resources.

A final object of our invention is to provide a Magneto-electric method of exploration for oil and/or gas fields, for mineral deposits or for geothermal energy resources by mapping the electro-telluric current densities at least at two different depths of investigation that bracket the depths at which such deposits are expected to be found in order to ascertain the differential changes in the magnitudes and in the polarities of such electro-telluric currents between those two depths of investigation and thereby delineate the areal extent of such deposits within the bracketted depth interval.

BRIEF DESCRIPTION OF THE DRAWINGS

FIG. 5 shows a ring of electrolytes of various oxidation levels in electrolytic contact through porous balsa wood partitions that prevent their physical mixing.

FIG. 6 is an electrolytic model of an oilfield fuel cell that simulates a portion of the oxidized-reduced contact on the side of a geochemical chimney overlaying an oil and gas field and that indicates the flow pattern, in direction and in sign of the electro-telluric currents.

FIG. 7 illustrates the self-potential (SP) gradients from three wells in and around a small oil field discovered in the Denver-Julesburg basin, Colorado.

FIG. 8 illustrates the various self-potential (SP) gradients that would be observed in various wells drilled in and around the hypothetical oil and gas field of FIG. 4, together with the gamma-ray intensity modifications of certain shaly marker beds such as have been observed above oil and gas fields.

SCIENTIFIC BACKGROUND TO THE INVENTION

In the earth there are many localized sources of electric potentials and currents. First, those that have an economic significance and second, those without significance and that are considered disturbances which have to be eliminated or minimized in order to be able to derive a significance from the electric currents generated by the economic sources.

The hypothesis that an oil and gas accumulation in the earth acts as a giant fuel cell over geologic time will be presented at some length. First, it will be shown that the injection of hydrocarbons into a simple cell, packed with clayey earth material, creates a negative potential with respect to the control or non-injected side of the cell. While the physico-chemical mechanism of electric potential generation is not clear, it is definitely the result of the generation of a redox potential contrast whereby the presence of hydrocarbons creates a reduced environment. Since hydrocarbons escape continuously vertically upward from an oil and gas field under their bouyancy effect, a chimney or funnel-shaped volume of reduced rocks exists over an oil field and that extends to the surface of the earth eventhough the rate of vertical escape has been proved microscopic. Vertical hydrocarbon diffusion is not the only probable explanation mechanism; the vertical escape of waters expelled from shales by compaction, above and below the oil accumulations, which waters carry with them hydrocarbons in solution or in suspension, are also responsible for the observed changes in the redoxomorphic environment of oil and gas fields. In fact the water transport of escaping hydrocarbons may be the most important mechanism as it is known that the lowering of water temperature decreases hydrocarbon solubility, and more hydrocarbons are thus released from water solution as they reach shallower depths.

Such a redox potential contrast within the sedimentary rocks gives rise to electric currents; they issue from the outer boundary of the funnel, reach the near surface layer on the outside of the funnel and return downward inside the funnel. Such currents form large eddies, closed on themselves. This has been verified numerous times in field surveys as well as in laboratory experiments.

Figure 1:
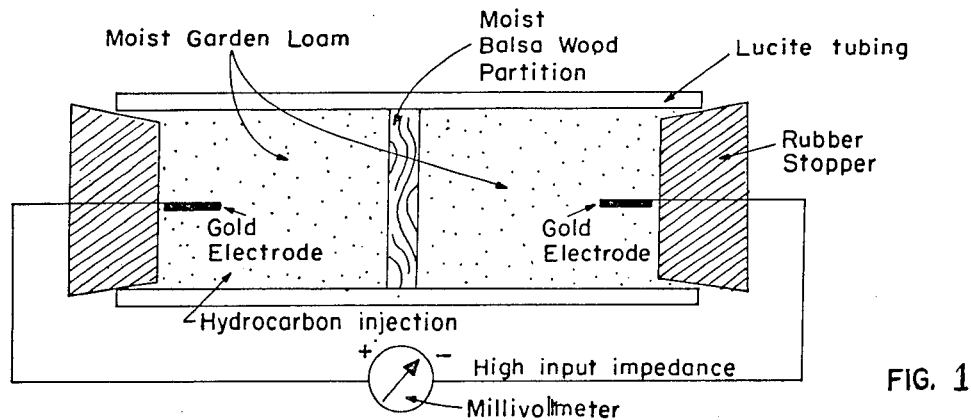
FIG. 1 is an experimental oil field fuel cell that simulates the generation of electro-telluric potentials and currents.
Figure 2:
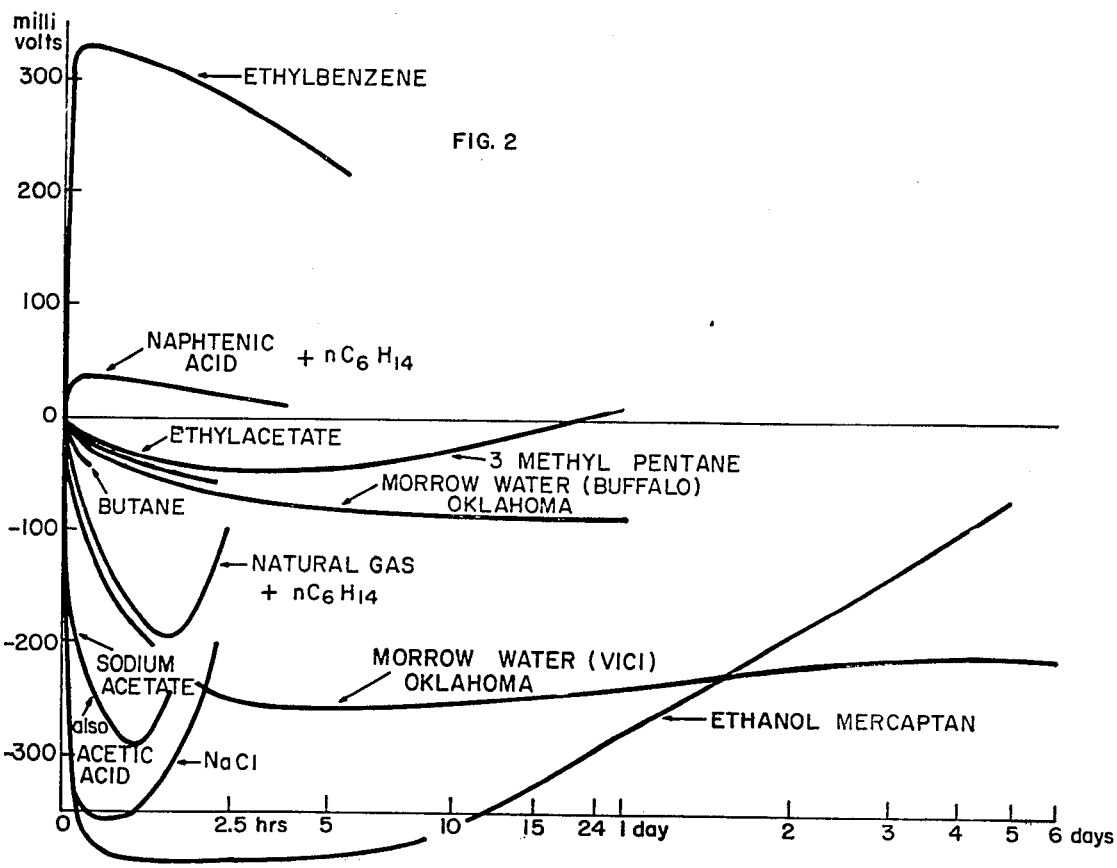
FIG. 2 gives a graphic presentation of the electric potentials generation versus time resulting from various hydrocarbons injected into the cell of FIG. 1.
Figure 3:
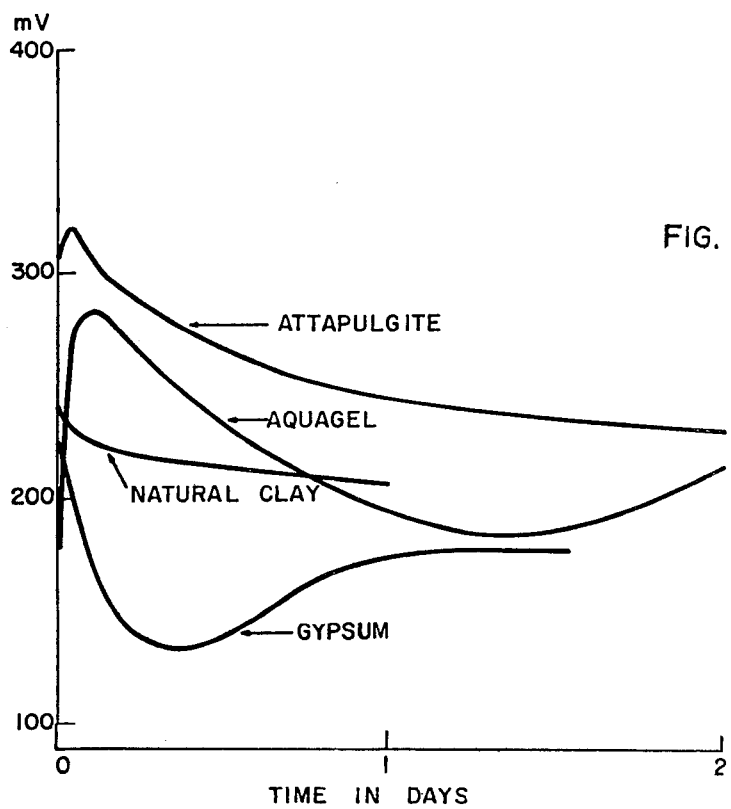
FIG. 3 gives the results of similar fuel cell experiments wherein clays of various composition were injected with methylcyclopentane.

Laboratory tests have established that fuel cell type sources of electric potentials and currents exist in the earth wherever hydrocarbons and associated organic chemical compounds (hydrogen sulfide, salts or organic acids, traces of mercaptans, etc.) accumulate in the earth in structural and/or stratigraphic traps. This giant fuel cell in the earth was simulated in the laboratory on a small scale in a solid plastic tube (lucite) 5 inches long and 1.5 inches in diameter (FIG. 1). A permeable partition (a balsa wood sheet) was placed in the center of the tube and moist clayey loam was packed on both sides. The ends of the tube were sealed by rubber stoppers in each of which a gold electrode was inserted. When equilibrium was established, a negligible electric potential existed between the two gold electrodes. At various times, hydrocarbons of varying composition (methane, butane, methylpentane, hexane, etc.) were injected on one side; the other side remaining undisturbed for control. Immediately upon injection, a negative potential was observed at the electrode on the cell side that was injected with hydrocarbons. This potential reached a negative maximum very rapidly, at times as high as −200 millivolts with respect to the control side. With unsaturated hydrocarbons and those containing sulfur compounds, higher negative potentials were observed (−375 millivolts). At times such potentials persisted for more than ten days to two weeks without "refueling". FIG. 2 gives a graphic presentation of the results obtained by means of the cell of FIG. 1. It is observed that most hydrocarbons and organic acetate give immediately, upon injection, a sharp negative deflection which persists at least one day and in certain cases for several days. Injection with ring hydrocarbon compounds gave sharp and immediate positive deflections. A complete theoretical explanation for this behavior has not been found as yet, but it is believed to reside in the ability of clay minerals to form complexes with hydrocarbon molecules, complexes which are positively charged in the case of saturated hydrocarbons and negatively charged in the case of ring compounds. The type of clays and hydrocarbons involved should therefore influence the results obtained. In order to verify this hypothesis some experiments were carried out with a number of different clays. Redox potential measurements were made in a cell containing a slurry in which a calomel reference electrode and a redox sensitive electrode (platinum) were inserted. The redox potential was measured by means of a high impedance potentiometer and the results are represented on FIG. 3. The slurries of the various clays were injected with the same amount of methylcyclopentane. Natural clay and gypsum showed an immediate drop in redox potential whereas in the case of attapulgite and of aquagel, the redox potential increased at first and then declined. In the main the ultimate effect of hydrocarbons injection into clays was a net reduction in redox potential, i.e., the environment permeated by hydrocarbons became reduced or accepted electrons.

The conclusion from these experiments is then drawn that accumulations of hydrocarbons and associated chemicals in the earth give rise in overlaying regions to lowered redox potential with respect to the surrounding barren country rocks.

Figure 4:
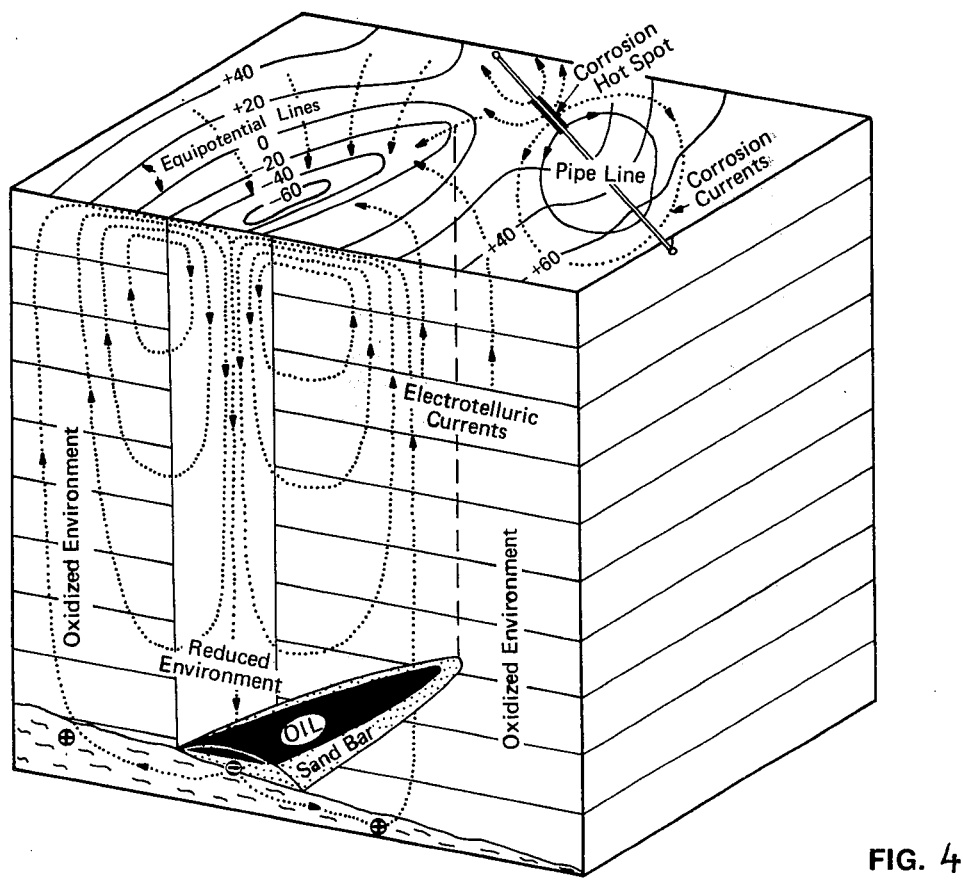
FIG. 4 gives a generalized representation of the physico-chemical modifications generated by an oil and gas accumulation within a stratigraphic trap in the overlaying sediments and it indicates the paths taken by the vertical electro-telluric currents generated by the oilfield subsurface fuel cell.

FIG. 4 gives a generalized idea of the physico-chemical modifications which the presence of oil and gas at depth creates in the overlaying sediments. The fundamental mechanism of oil and gas migration and accumulation which is implied here, and which is also generally accepted by the petroleum geology profession, is that formation waters which were expelled from shales under the compacting effect of the weight of the rock overburden and which contained highly disseminated hydrocarbon globules or hydrocarbons in solution because of the elevated formation water temperatures at depth, escaped vertically upward above the loci of oil and gas entrapment; i.e., structural or stratigraphic traps. Such expelled waters were filtered-out of their suspended hydrocarbons; oil and gas pools were thus formed. In their vertical escape paths, the waters released the hydrocarbons still in solution in a gradual manner as temperature declined at shallow depths, and these hydrocarbons rendered the overburden rocks more reduced than when they were originally laid-out, thus forming a "chimney" or "funnel" of reduced rocks which extended to the surface of the earth. When surface rocks were exposed to weathering agents, the reduced nature of the upper part of the chimney may have been partially oxidized. However, the escape of compaction waters and of hydrocarbons takes place continuously during geologic time and thus the fuel cell is being replenished continuously.

A permanent and durable physico-chemical contrast is thus created above oil and gas pools which is manifested in many ways, but for the present purpose, this contrast is mostly observed in the near surface rocks by their ability to generate electric potentials and currents as if from a giant fuel cell, the source of potential being distributed on the external surface of the subsurface chimney.

This fuel cell generates current flow lines closed on themselves, a few of which are represented on FIG. 4. Normally, the direction of the earth currents, or electro-telluric currents so generated is as shown over this stratigraphic trap. Such currents and their distribution in the earth last indefinitely during geologic time, or as long as the fuel cell is being resupplied with "fuel" in the form of escaping hydrocarbons in solution or in suspension in the compaction expelled waters or by molecular gas diffusion from the accumulation of oil and gas.

The mechanism of oil and gas migration and accumulation represented in FIG. 4 and the development of a cylindrical geochemical anomaly over the oil accumulation as represented, has been verified by well documented articles, a short review of which will be given.

Reliable near surface hydrocarbon anomalies have been reported for over 30 years as a result of geochemical exploration. Recently, Horwitz (Horwitz, Leo—Hydrocarbon Geochemical Prospecting after Thirty Years, "Unconventional Methods in Exploration for Petroleum and Natural Gas", SMU Symposium, Dallas, 1968, pp. 205 – 218.) has presented some very revealing data from the Hastings field, Texas, showing soil hydrocarbon maps measured in 1946 and in 1968 over the same area. In the intervening oil production period of 22 years the near surface anomaly had all but disappeared; the obvious conclusion is that the hydrocarbon leakage from the structure has ceased. However, this stoppage of hydrocarbon leakage cannot be the result of depleted reservoir pressure because the field is under active water drive; the reservoir pressure having dropped only a negligible amount in the Lower Frio sand from 2755 psi in 1934 (when discovered) to 2600 psi in 1956 during which period 50 million barrels of oil were produced. The explanation for the cessation of hydrocarbon leakage must be sought elsewhere than in the diffusion theory. As a result of the oil production and of water-influx into the reservoir, the compaction-expelled-water and its dissolved gases, which was originally escaping vertically at the edge of the field, has been encroaching into the oil reservoir rock itself for the last 36 years, where it replaced the oil produced. Hence, the near surface geochemical anomaly has not been resupplied with vertically escaping hydrocarbons and, over the years, soil bacteria have destroyed the near surface anomaly that existed in 1946. This one geochemical case history greatly supports the hypotehsis of a "geochemical chimney" associated with primary oil migration and accumulation.

An explanation of the origin of electro-telluric currents associated with oilfields is readily found in the hypothesis of an associated geochemical chimney.

The experiments with the fuel cell of FIG. 1 which have been briefly reported-on indicate that the inside of the chimney which has been permeated by compaction waters containing hydrocarbon in solution attain a redox potential much reduced from that of the same rocks permeated by waters devoid of such hydrocarbons. Hence, an electric potential difference is maintained between the two regions. When such a potential difference is present in a conductive medium such as sedimentary rocks electric currents must flow until the cell's energy is exhausted, unless continuous "refueling" by leaking hydrocarbon takes place.

While a physical model is not necessarily a proof of a theory or hypothesis, a satisfactory model is nevertheless very suggestive that the working hypothesis is worth pursuing.

Such a model has been made by means of a "closed chain of electrolytes". Some misleading statements appear in the literature to the effect that an electrolyte chain does not give rise to an electric current. This is true only when the ions of dissociated salts in aqueous solution do not readily change their oxidation states, i.e., when there is no change of valency involved. If the chain of electrolytes contains ions that change in valency, such as in the reaction $Fe^{++} = Fe^{+++} + e$, the liberated electrons ($e$) give rise to an electric current in a closed conductive circuit. Such a ring of electrolyte was made as shown in FIG. 5, where the solutions in contact are Manganous Chloride ($MnCl_2$) and Ferric Chloride ($FeCl_3$). The two solutions were prevented from mixing physically by thin balsa wood partitions between the electrolytes but which allow electric current flow. The connecting electrolyte in a separate compartment was ordinary tap water. Along the length of this compartment, an ohmic potential drop was registered immediately upon filling each compartment with its respective electrolyte, indicating that an external cell current was flowing from the oxidized solution ($FeCl_3$) to the reduced solution ($MnCl_2$).

The oxidized solution thus accepts electrons liberated from the reduced solution. The conventional electric current is of course in the opposite direction from the electronic current.

In the earth, the fuel cell generates electro-telluric currents closed upon themselves, the paths of which are as shown on FIG. 4. Many models of this situation have been made in the laboratory by Pirson and Negut (Pirson, S. J. and Negut, Aurelian: "Preliminary Model Experiments in Redox Well Logging", (with Applications to Mineral Exploration). SPE Paper No. 2593, October 1969. Also in Revue Roumaine de Géologie, Géophysique et Géographie — Vol. 16, No. 1, pp. 145 – 167, (1972)), with the solutions cited above, but also with ferrous-ferric solutions. Such a cell is shown in FIG. 6 which can be visualized as representing the left section of the chimney associated with the stratigraphic trap of FIG. 4, the reduced zone being simulated by $MnCl_2$, the oxidized zone by $FeCl_3$, and the weathered, or near surface zone, by tap water. As expected, a conventional electric current flowed immediately upon completion of the electrolyte circuit in the simulated weathered zone and in the direction shown by arrows as evidenced by ohmic potential drops measured within the tap water section and graphed as the ET profile on FIG. 6. The two electrolyte solutions shown had highly different redox potential or Eh; namely $Eh(MnCl_2) = +920$ mv and $Eh(FeCl_3) = +1040$ mv. This redox potential difference was transmitted within a very short time to the tap water or weathered zone (original $Eh = +375$ mv) as evidenced by the Eh profile of FIG. 6. Therefore, over an oilfield, one may expect the rocks immediately below the surface weathered zone to reflect the electrochemical properties (Eh) of the formation fluid underlying it as indicated by the Eh profile.

The observations and hypothesis made above immediately suggest methods of exploration for deep seated oil and gas accumulations, as well as for any other minerals whose concentrations and accumulations are associated with changes of rock environment, from oxidized to reduced.

The methods described in the present invention are based upon the measurement of the magnetic perturbations created in the earth magnetic field by the earth's vertical electro-telluric currents and by virtue of Maxwell's law of electro-magnetic induction.

While the above discussion describes our preferred theory for the explanation of the generation mechanism for the electro-telluric currents, there are other mechanisms that may be operative jointly or separately with the oil field fuel-cell theory and the various effects of each may be superimposed on each other, such as the following described mechanisms:

1. Selective desorption of anions from clays by escaping hydrocarbons.

Laboratory tests on soils and shales have shown the release of anions and particularly chlorides as indicated by a chloride selective electrode when said soils and shales were injected with hydrocarbons.

2. Existence of a chimney-shaped salinity contrast over and around oil and gas fields.

An observation which has been made repeatedly from electric logs by one of the applicants is that the shale resistivities overlying an oil and gas field are of lesser magnitude (50% or more) than the resistivities of the same correlatable shale outside the oil field funnel. This is most evident in the 7000 ft., 7600 ft., and 8600 ft. shale sections overlying the Elk City field of the Anadarko basin, Oklahoma, but it has been observed in many other places, one of which is over the Coulommes field, Paris basin, France in the Gault clay.

There may be several explanations for this phenomenon (which one of the applicants has used successfully many times as a mapping prospecting parameter in *Projective Well Log Interpretation*), but the most plausible explanation is derived again from the generally accepted view of oil and gas migration and accumulation from a dilute suspension of hydrocarbons in the waters expelled by compaction from the shales encasing the reservoir rocks. At first the waters escaping from compacting shales are known to be quite salty (at least of the salinity of sea water; 35,000 ppm NaCl, a salinity which is known to have remained relatively constant over geologic time). They are the waters that escaped vertically over the oil accumulation after leaving behind the miriad of oil bubbles that coalesced into an oil pool. Later in geologic time and after the oil accumulation is complete, shale compaction continues though at a much reduced rate and additional shale waters are expelled, the salinity of which is known to be much reduced from the original sea water. This water must of necessity escape vertically around the oil field, thus a funnel or chimney of saline rocks overlays the oil accumulation whereas the outside rocks are permeated by realtively fresh waters. An electrolytic concentration cell therefore exists between the waters within the funnel and those in the outside rocks. Since the formation salts are mainly NaCl and since the ion $Cl^-$ has a higher mobility than $Na^+$, the inside part of the funnel becomes positive with respect to the outside rocks and the earth currents so created flow from inside the funnel to the outside, then vertically up and then return downward inside the funnel. The electric current direction under this assumption is identical with that created by the redox oil field fuel cell.

This salinity contrast, all around a vertical chimney that delineates the oil and gas field, is responsible for a concentration (or diffusion) electric potential effect which is distributed throughout the vertical geologic section. Such electric diffusion potentials have been verified by laboratory experiments. The resulting electric currents directed downward through this funnel and their gradual downward external and radial flow away from the axis of the funnel give rise to electrophoresis, or transport and selective separation of cations away from the funnel. In particular, uranium ions are displaced away from the funnel and this is another plausible explanation of the "radioactivity low" associated with oil fields, not only at depth but also on the earth surface. Laboratory experiments by Coppens (Coppens, René — "Action des Courants Electriques sur le Déplacement de l'Uranium dans les Roches" (Effect of Electric Currents on the Displacement of Uranium from Rocks) C. R. Acad. Sc. Paris 258, No. 4, Jan. 27, 1964, pp. 1275 – 1277.) have definitely shown that rocks may be depleted of their uranium content through the passage of a weak electric current over long periods of time. The observed reduced radioactivity of shales overlaying an oil field, thus becomes another striking indirect proof of the existence of electro-telluric currents.

3. Proof of the existence of vertical electro-telluric currents by their direct observation from electric well logs.

The electro-telluric effect of oil and gas fields was first noted on electric well logs and maps of this effect, in intensity and in sign, were published in "Projective Well Interpretation" articles (Pirson, S. J. — "Projective Well Log Interpretation", World Oil — October and November, 1963 and August, September, October and November, 1964.; Pirson, S. J. — "Environmental Logging and Mapping in the Search for Minerals", Soc. Prof. Well Log Analysts — May 1969 Symposium Houston — Paper I.; Pirson, S. J. — "Oil Finding by Systematic Well Log Analysis" — The Log Analyst 6 No. 5, pp. 4 – 17, January – March 1966.) under the name "Vertical Migration Parameter" or "VMP" as it was realized this effect was related to some vertical motion of matter. The mechanism by which currents are related to petroleum migration and accumulation was established only recently. The vertical migration parameter is merely an observation of the ohmic effect (or electric potential drop by application of Ohm' s law) that vertically downward electro-telluric currents exist over gas and oil fields within the chimney of chemically reduced rocks. Also, such currents return upward outside of this chimney and spread a considerable distance away from it.

FIG. 7 shows the probable subsurface distribution of electro-telluric current vortices around a small oil field in Colorado (Denver-Julesburg basin). Well A is producing oil and an upward positive SP gradient of about 10 mv between 5,540 and 6,040 feet indicates electro-telluric currents are flowing downward in this predominantly shale section.

Well C is in a barren region where electro-telluric currents flow upward in the said correlatable shale section as indicated by an SP gradient opposite in sign, but of similar current density.

Well B is intermediate in position between Wells A and C, presumably near the field's edge since the said correlatable shale shows a section traversed by downward currents (6,050–6,300 feet) and a section traversed by upward currents (5,800–6,000 feet).

This is a random example selected from many Projective Well Log Interpretation surveys made during the last 10 years. This phenomenon has been encountered in such a generalized manner over a large number of oil fields that it must be considered as a law of nature.

The objective of magneto-electric surveys is to map at the surface, or from above the surface of the earth, the extent, the intensity and the shape of electrotelluric current vortices present at depth in association with commercial gas and oil accumulations, with other mineral deposits and with geothermal energy resources.

While the largest magneto-electric anomalies are observed at the surface of the earth, the significance of Magneto-electric surveys is enhanced greatly when they are projected downward to near the depths of electro-telluric current sources, i.e., levels of gas and oil accumulations.

These giant electro-telluric cells often may form a single current vortex extending from the oil accumulation to the surface of the earth. But more generally, superimposed current vortex cells of different polarity and intensity will be observed from electric well logs. Over a major oil field, individual cells show current vortices all in the same direction and electro-telluric effects often extend within near surface formations.

During the past 10 years, several gas and oil fields have been discovered in areas predicted to be favorable prior to discovery on the basis of subsurface electro-telluric current mapping from available electric logs. Such fields include Felda, West Felda, Leghigh Acres, Lake Tafford and Bear Island (Florida, 1965); N. Birch Creek Unit Extension (Wyoming, 1965); Carpenter (Oklahoma, 1970); Peoria, North Peoria and Latigo (Colorado, 1971) and Womack Hill (Alabama). Years indicated are those of discovery; surveys were made considerably earlier than the dates of discoveries shown.

Subsurface mapping of VMP parameters requires the availability of electric logs of consistent quality, type of recording, type of SP electrode, etc., conditions that cannot always be fulfilled. However, a major shortcoming is always that there are seldom a sufficient number of well logs in a prospective area for safe interpolation or extrapolation of contour lines and much must be left to the imagination in trying to visualize the distribution of subsurface electro-telluric currents for the purpose of delineating oil and gas fields. It is an object of Magneto-electric exploration to provide means for interpolating and extrapolating from favorable indications of oil and gas from existing wells as detected by well log analysis.

It is of interest to derive from the electric well logs shown in FIG. 7 an order of magnitude value for the intensities of the electro-telluric vertical current flux. This will now be done within the shale section immediately overlaying the D and J sands. Positive vertical SP gradients of 10 mv per 500 feet are observed in well A and similar negative values are observed in well B. The shales have an average resistivity of 5 ohm-meters. Considering a horizontal surface one acre in area, and by application of Ohm's law, an electro-telluric current flux-density of 53 milliamperes per acre is computed. It will be shown from example magneto-electric surveys that this current flux density is of comparable magnitude with that calculated over favorable oil and gas prospects.

FIG. 8 illustrates the various SP gradients that would be observed in various wells drilled in and around an oil field, in a stratigraphic trap such as represented in FIG. 4. Well No. 2 discovered oil in the reservoir sand trap and its SP curve gradient is toward the positive when traveling up-ward. Wells Nos. 1, 3, and 4 are dry holes and the upward SP gradients are reversed. In addition FIG. 8 illustrates the radioactive modifications of a marker shale bed as its potassium and uranium (also radium) ions are removed from above the oil fields by the action of the outward flowing electro-telluric currents through the process of electrophoresis. The reduction of the radioactivity of shales directly overlaying oil fields has been observed over at least 30 known oil and gas fields from radioactivity (gamma ray intensity) well logs. This observation has also been used successfully in predicting favorable petroliferous areas wherein the N. Heluma (Ellenburger) and the XBC (Devonian) fields were subsequently discovered in Upton County, Texas.

In addition to exploring for oil and gas fields, Magneto-electric surveys may solve the following mineral exploration problems by delineating the sub-surface sources of electric potential generated and the resulting distribution of electrotelluric currents.

1. Uranium Roll-Fronts

Uranium deposits that occur to the extent of 95% in sedimentary rocks are formed by the precipitation of Uraninite (Pitchblende or black ore) from solution in meteoric waters of infiltration at the contact between a zone of oxidation and a zone of reduction within permeable sands, which contact is generally called a roll-front. Such sands must exhibit a regressive character so that they will lend themselves to water infiltration at the outcrops. Transgressive sands are less likely to be mineralized because they do not offer an easy access to meteoric waters. Magneto-electric surveys can help locate and delineate the probable areas of uranium mineralization. At the roll-front, a redox fuel cell is generated, the effect of which results in the observation of a long, narrow electric current anomaly, the upward flowing part of which is upstream and the downward flowing part is downstream from the mineralizing waters of infiltration.

2. Sulfide Ore-bodies

The delineation of sulfide ore-bodies by electro-telluric means is well known and has been highly successful when such ore-bodies are partly exposed in the zone of oxidization and partly in the reduced zone. A redox cell is thereby generated which surface electric potential measurements can outline readily. This is the oldest known geophysical technique, its use having been reported by R. W. Fox in 1828. Much literature is available on the subject and it will not be belabored here.

The sulfide ore bodies most susceptible to discovery by electro-telluric surveys are those of copper, iron, cobalt, galena, manganese, mercury, etc.

The flow patterns of the electro-telluric currents may be mapped from the surface by means of Magneto-electric surveys, the interpretation of which is altogether similar in every respect to the interpretation of such surveys for oil and gas accumulations.

3. Native Sulfur Ore Bodies

Free sulfur develops in pockets of restricted areal extent within gypsum and anhydrite beds as a result of the action of anaerobic sulfate reducing bacteria which derive their energy from organic matter and their oxygen from sulfates (gypsum and anhydrite). In the course of this process, the bacteria create or develop a reduced environment.

The basis for the expectation that electro-telluric methods are applicable to sulfur exploration rests on the accepted theory of generation of free sulfur from gypsum and anhydrite by the action of anaerobic sulfate reducing bacteria when their required energy is supplied by organic matter, i.e., by leaking hydrocarbon gases or liquids that escape from an oil and gas field present below or laterally. The hydrocarbon escape would be through cracks and fissures usually associated with tectonic deformations. This combination of events would give rise underground to a giant fuel-cell with the generation of free sulfur and $H_2S$ gas that would escape vertically through the over-burden and the surface soil. Not all hydrocarbons are consumed by this process and the combination of hydrocarbon and $H_2S$ gas escape changes the physico-chemical environment of the rocks overlaying the locus of bacterial activity, modifying particularly their Eh and pH. The expectation is that the environment immediately overlaying a center of sulfate reducing activity becomes highly reduced.

The favorable sulfur generating environment extends some distance above the sulfur ore deposit, both laterally and vertically, by virtue of the fact that all escaping hydrocarbons and $H_2S$ gases do not participate in the geochemical reactions.

Accordingly, a chimney of reduced rocks extends toward the surface from the site of the sulfur ore deposite thereby forming a contrast of rocks of different redox values and that will lead to electro-telluric currents of the type associated with oil and gas accumulations. Again, such deposits may be surveyed by Magneto-electric methods which essentially map the distribution of electro-telluric currents.

GEOTHERMAL ELECTRO-TELLURIC CELL

It is well known that geothermal energy resources are associated with a vertically decreasing temperature at a larger rate of decline than the normal geothermal gradient. Thus a chimney of rocks warmer than the country rocks overlies deposits of geothermal steam in much the same manner as the geochemical chimney previously discussed for oill and gas fields. It has been shown by laboratory experiments that a thermal gradient (i.e., when a temperature difference exists between two regions within an electrically conductive rock mass) generates electric potential difference in this rock mass and that an electric current will thereby be generated. For most rocks, the cold side is negative with respect to the hot side which is positive. In a geothermal chimney over a geothermal steam deposit, electro-telluric currents will therefore flow upward inside the geothermal chimney to return vertically downward outside of the chimney. These geothermal electro-telluric currents, therefore, form circulation patterns that are opposite to those observed in association with oil field fuel cells.

A proof of the existence of geothermal electro-telluric currents and of their polarity with respect to the geothermal gradient direction may be derived from the results of the Aardvark nuclear explosion experiments where the electric potential generated in the subsurface by the intense heat of the explosion was directed from positive above the locus of the bomb to negative at an electrode 3500 feet away from the explosion.

Again Magneto-electric surveys, as here described, should prove suitable for the delineation of the subsurface distribution of geothermally generated electro-telluric currents, but taking special note of the reversal in polarity.

While we have described in great details various mechanisms by which vertical electro-telluric currents are associated with oil and/or gas accumulations at depth and with certain mineral deposits in the earth, we do not wish to hold to any one theory as being more prevalent than another nor that any-one such theory is altogether satisfactory in explaining the vertical electro-telluric currents. In fact, no such theory is needed since vertical electric currents have been observed by their ohmic potential drop effects over and around oil and gas accumulations are overlain by thick uniform shales. Then the SP curve drifts within such shales are in opposite directions for dry holes and for oil and gas producers. One of the applicants has made hundreds of such observations which prove without a doubt the existence of vertical electro-telluric currents in association with oil and gas accumulations.

DETAILED DESCRIPTION OF THE INVENTION

Applicants will now proceed with the disclosure of the methods and means for performing magneto-electric measurements at the surface of the earth in order to ascertain the existence and the distribution of significant electro-telluric current patterns and to relate them to the existence of oil and/or gas fields, to other mineral deposits or to geothermal energy deposits. Description of the invention had already been made in Disclosure Documents filed by applicants with the U.S. Patent Office: No. 009732, 3/24/1972, S. J. Pirson — Electrotelluric Exploration and No. 012998, 8/24/1972, S. J. Pirson and J. E. Pirson — Magnetoelectric Exploration.

Theoretical Basis

By virtue of Maxwell's electromagnetic equations, the earth electric and magnetic fields are related. When both fields are static, i.e., when invariable or nearly invariable with time, we may write the following equation around a closed path on the earth surface $$(1) \quad \iint_S \text{curl } \vec{H_t} \cdot dS = 4\pi i = 4\pi \iint_S \vec{U_n} \cdot dS$$

where:
- $i = \iint_S \vec{U_n} \cdot dS$ is the total electric current through the surface S. The dot represents a scalar product of two vectors: $\vec{U_n}$ and $dS$.
- $\vec{U_n}$ is the vector representing the current density through elementary surface $dS$ and measured in a direction perpendicular to elementary surface $dS$.
- $S$ is a surface of the earth bounded by perimeter of length "$l$".
- $dS$ is a vector normal to surface S.
- $\vec{H_t}$ is the vector representing the total earth magnetic field intensity.
- $\int_S$ represents a surface integral over surface S By Stokes' theorem, we may write $$(2) \quad \iint_S \text{curl } \vec{H_t} \cdot dS = \oint_l \vec{H_t} \cdot dl$$

when the various force fields are expressed in electromagnetic units. $\oint_l$ represents a line integral of vector $\vec{H_t}$ along a closed perimeter of length $l$ and carried-out in a clockwise direction.

Combining equations (1) and (2) and writing them in electrostatic units, we have $$(3) \quad \oint_l \vec{H_t} \cdot dl = \frac{4\pi}{c} i$$

where $c$ is the velocity of light: $3 \times 10^{10}$ cm/sec. Equation 3 relates the total vertical electric current distributed in the earth under surface S to the line integral of the total earth magnetic force around the closed circuit $l$ that encloses surface S. This line integral is substantially that of the horizontal component of the earth magnetic field around the same closed loop because the integral of the vertical component of the earth magnetic field is zero when the path $l$ and the surface S are selected to be in the horizontal plane, or in a plane substantially horizontal at the surface of the earth.

Current $i$ may then be considered to be the vertical electro-telluric current created by a subterraneous oil and gas accumulation, or other type of mineralization such as sulfides, or geothermal steam energy entrapped in the earth. It has been shown in the theoretical discussion that such mineralizations give rise to downwardly directed vertical electric currents that concentrate radially and horizontally near the surface of the earth after their return from their deep-seated sources where the currents are generated by electrochemical reactions between the mineralizations and their geologic environment.

There are two ways by which the vertical electric currents in the earth may be mapped magnetically, first by magneto-electric reinterpretation of existing magnetic maps, preferably those that have been surveyed with accuracy before oil and gas field development so that surface and subsurface metallic disturbances are not present and second by making a new Magneto-electric survey properly planned so as to measure only the magnetic vortices created by vertical earth electric currents and to the exclusion of the disturbing factors created by the vertical earth magnetic field, daily variations, abnormal magnetic polarization, etc.

1. Magnetoelectric reinterpretation of existing Magnetic Maps.

Among the existing magnetic maps the most suitable for this work are those that surveyed the distribution of the total earth magnetic field intensity. This vector-force includes the vertical and the horizontal components of the earth magnetic field. The vertical electro-telluric currents do not affect the vertical magnetic field intensity. Thus the value of a line integration of the total magnetic vector around a closed path on the earth surface is the result of the work done by the horizontal component. However, the declination angle is unknown. Therefore, a closed circuit integration is only an approximation of the desired result. The problem is to show that the results so obtained are nevertheless valuable. This will be done by statistical evaluation of the oil and gas well predictive ability of this technique which was used over an area exceeding 1,500 square miles.

When a magnetic map of a prospective territory is available, the simplest manner by which line-integrals of the magnetic field intensities may be carried-out around numerous areas of finite size is to grid the map into squares of one half to one mile on the side. Preferably they should be oriented in the direction of the magnetic north. In this manner the line integrals along the north and south lines of each square are both nearly zero, since the horizontal component of the earth magnetic field is at right angle (90°) to the integration path. Theoretically, all one needs to do is to integrate along the east and west sides of each grid square and add the results vectorially. If one chooses to integrate around each square clockwise, positive closed line-integral values correspond to downward electro-telluric current flow by virtue of the right hand screw rule that determines the direction of the magnetic flux due to an electric current in an infinitely long wire. In the case at hand, the electric current may be considered as flowing vertically down over an oil field in a half infinitely long tube; the horizontal lines of electric current flow near the surface of the earth having no magnetic effect on the horizontal magnetic vortex which it is intended to measure. Consider square A in the grid system of FIG. 9 which is oriented in the magnetic north direction. The curves on each side represent the horizontal variations in the total earth magnetic field intensity multiplied by cosine I; I being the angle of inclination of the total vector $\vec{H}_t$ on the horizontal plane. We have $\vec{H}_h = \vec{H}_t$ cosine I and the integrated value of this function is represented by hachured areas under the curves $A_1$ and $A_2$. We have for the magnetic vortex LI in a clockwise direction over area A (4) $LI = \oint_l \vec{H}_t \text{ cosine } I.dl = A_2 - A_1$ The integration procedure is repeated at every square grid and for conformity, the line-integral is always taken in a clockwise direction. When the values of LI are positive, downward electro-telluric currents are indicated and, conversely when negative, the electro-telluric currents flow upward.

In practice, if variations in $\vec{H}_t$ are not rapid and wild, it is possible to consider only the values of $\vec{H}_t$ cosine I at the corners of the square, and their sum is twice the line-integral over the unit grid distance chosen. One may also leave out the value of cosine I if the angle of inclination is relatively constant within the area under investigation. This, is general, will be the case when the size of the squares in the grid are small enough to assume a linear variation in $\vec{H}_t$ cosine I along each side of the square.

By way of example one may make the following calculations in order to obtain the magnitude of the electro-telluric currents under one square mile area of the earth surface when the line-integral (LI) is 20 gamma x miles. One gamma ($\gamma$) is equal to $10^{-5}$ Oersted.

$LI = 20 \times 10^{-5} \times 5280 \times 30.5$ Oersted $\times$ cm.

$= 30$ Oersted $\times$ cm.

By equation (3), in the emu system of units, we have for the electro-telluric current density:

30 Oersted $\times$ cm. $= 4\pi i_{emu}$

Thus, $i = 2.4$ emu $\times$ mile$^{-2}$ $= 37.5$ milliamperes/acre which is of the same order of magnitude as the vertical current computed from certain electro-telluric and equipotential surveys of known oil fields.

In general, the reinterpretation of pre-existing magnetic maps is not altogether satisfactory because the original data have already been relaxed around closed contours and in so doind the magnetic vortices are partially eliminated. Hand contoured magnetic maps are preferable especially when they show the original data on a regular square grid pattern which may be used directly into the filtering process to be described.

Ground magnetic survey maps of the variations in the horizontal component of the total magnetic field vector would be better for the purpose at hand but they are seldom made in oil field territories, although they are made over mining prospects.

With respect to oil and gas exploration, the preferred type of reservoir to be explored for is the stratigraphic trap because it is not likely that magnetic polarization and basement relief structures will be associated with them. Thus a simple filtering technique is likely to extract the magnetic vortices due to the vertical electro-telluric currents generated by this type of oil and gas accumulation.

When the oil and gas entrapment is associated with a basement structure or an anomalous magnetic polarization effect, it is necessary to remove this effect in order to isolate the significant magnetic vortices. Some of the numerical filters to be discussed hereafter are designed to do this on magnetic maps regardless of the components of the earth magnetic field measured (total vector or horizontal vector) and of whether it is a ground or an airborne survey.

Figure 10:
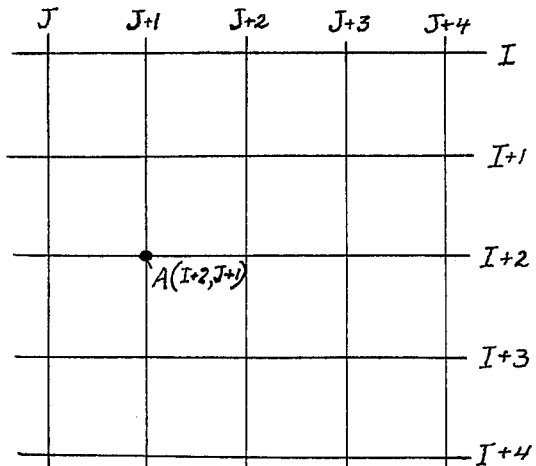
FIG. 10 illustrates a four by four unit-grid used in filtering digitized airborne magnetic data in order to sift-out the magnetic perturbations created by vertical electro-telluric currents in the earth.

The numerical filtering process is achieved by a convolution of the observed data with a spatial filter operator so as to obtain a response or measurement of the magnetic field perturbations generated solely by the vertical electro-telluric currents in the earth that are associated with accumulations of oil, gas, uranium roll fronts, sulfide minerals and/or geothermal energy. (FIG. 10)

Among the two dozen, more or less, numeric filters that were tested, two proved to be more efficient than others in delineating the favorable oil and gas bearing regions in a prospective territory.

D2 filter: This is a differential filter that operates on the difference between the raw data, $A(I,J)$, and their curvature, $D(I,J)$, as given by the following equation:

$$D(I,J) = 2.0*A(I+1,J+1) - [A(I,J) + A(I,J+1) + A(I,J+2) + A(I+1,J) + A(I+2,J) + A(I+2,J+1) + A(I+2,J+2) + A(I+1,J+2) + A(I+1,J+1)] / 3.0$$

where the $A$'s are the magnetic intensities read at the various points of coordinate $I$ and $J$ of the grid array. The following numerical filter is then applied to the D values as follows:

$$LI(I+1,J+1) = D(I,J+1) + D(I+1,J+2) + D(I+2,J+1) + D(I+1,J) - D(I,J) - D(I,J+2) - D(I+2,J+2) - D(I+2,J)$$

The values of LI are then plotted at their respective coordinates on the maps and the values are contoured, either by hand or by a mechanical plotter and contour routine.

Figure 11:
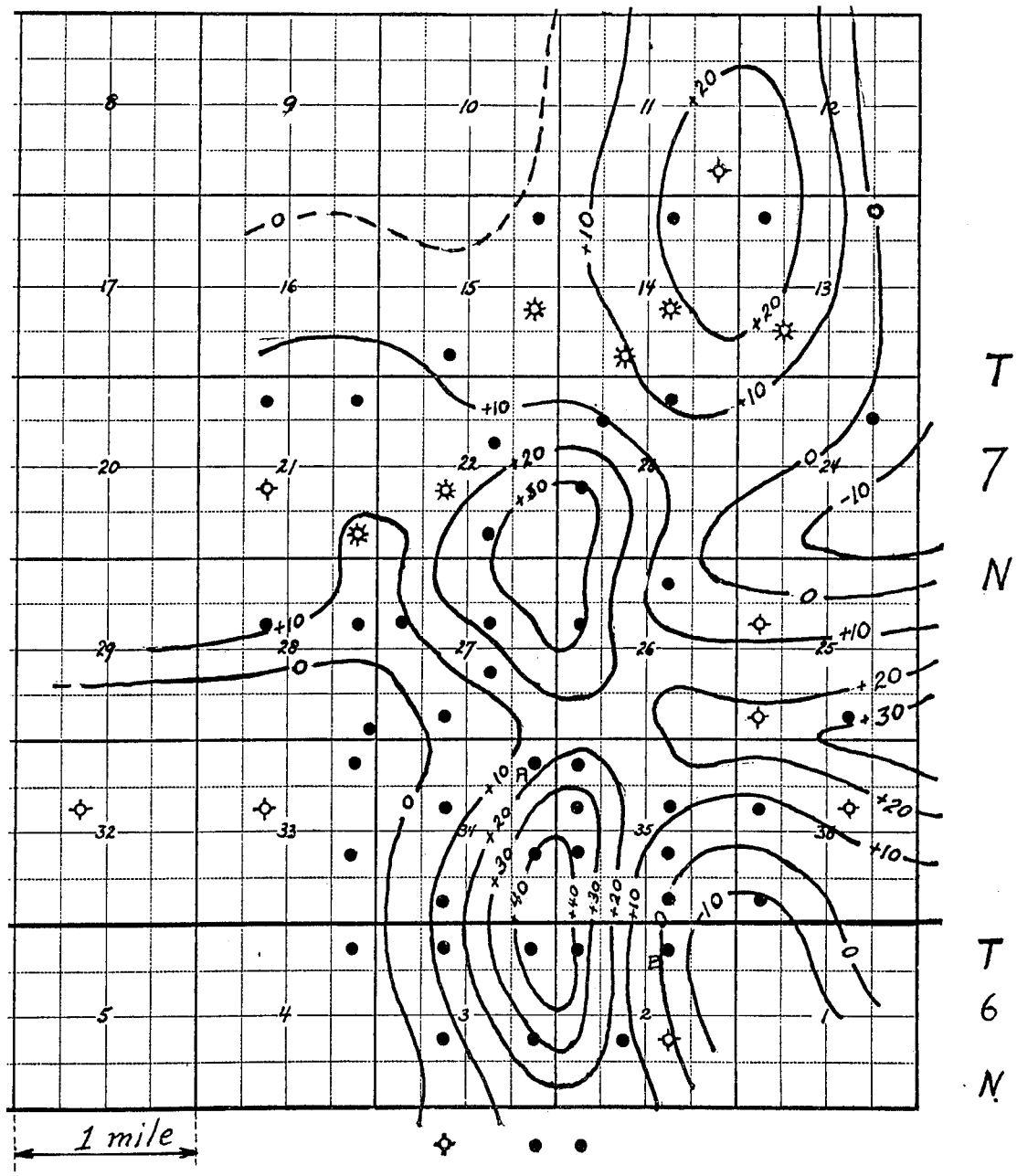
FIG. 11 shows the results of an airborne magneto-electric interpretation using a four-mile by four-mile filter over the North West Norge field, Oklahoma.

FIG. 11 is an example of reinterpretation results obtained by filter D2 over the NW Norge field of Grady County, Oklahoma that was discovered in Feb. 1971. The well locations, as of July 1972, are shown on the same map and the unusual correspondence between the actual limits of production and that predicted by the zero vertical electro-telluric current flux density in milliamperes per acre should be considered as positive proof of the existence of the magnetoelectric effect.

OM4 filter: This is a filter that operates on the original data, $A(I,J)$, located on the sides of a square of grid unit 4 × 4. The formula for this filter is as follows:

$$LI(I,J) = A(I,J+1) + A(I,J+2) + A(I,J+3) + A(I+1,J+4) + A(I+2,J+4) + A(I+3,J+4) - A(I+4,J+3) - A(I+4,J+2) - A(I+4,J+1) - A(I+3,J) - A(I+2,J) - A(I+1,J) - 3.0*[A(I,J+4) - A(I+4,J)]$$

Figure 12:
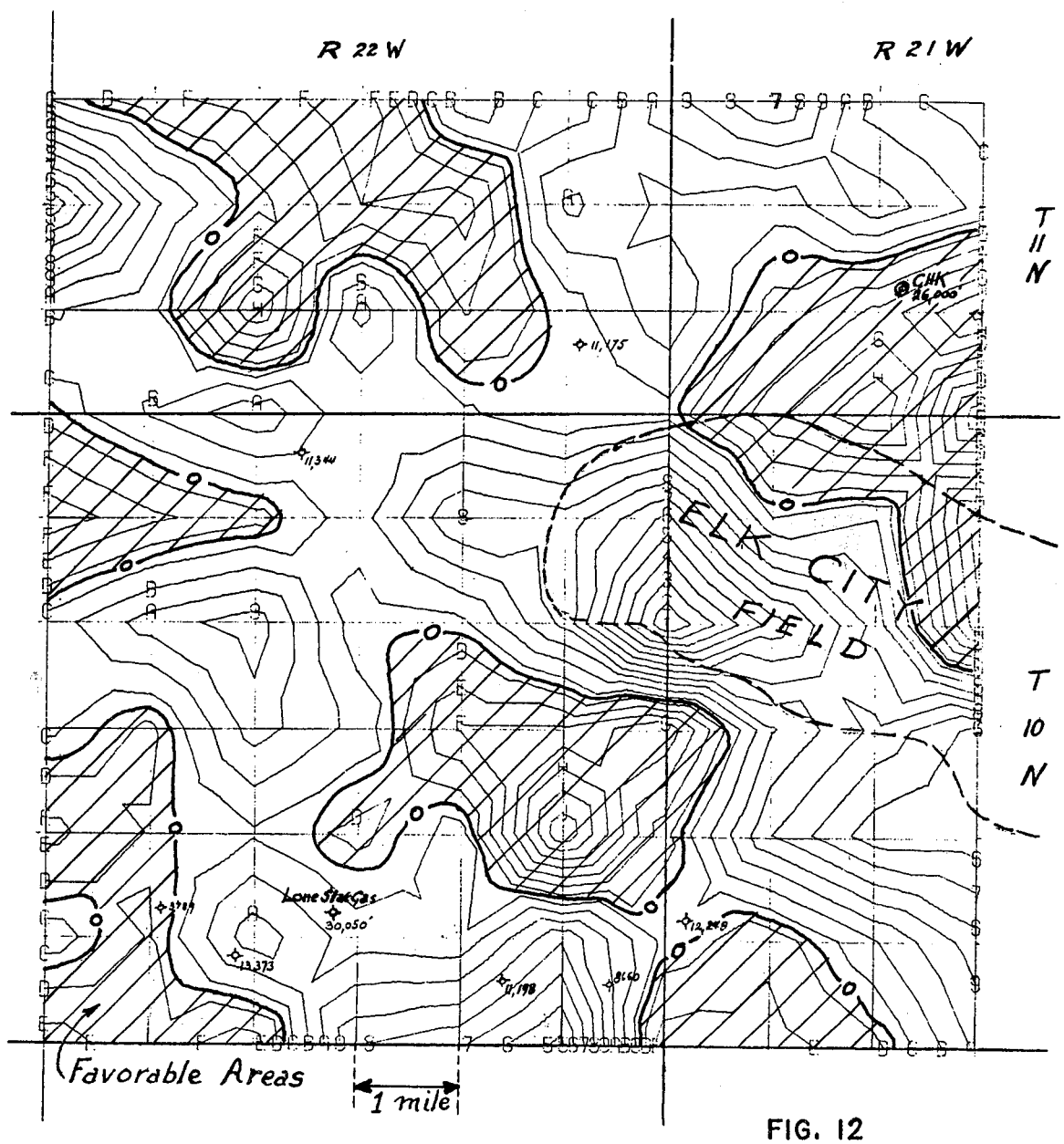
FIG. 12 shows the results of an airborne magneto-electric interpretation using a four-mile by four-mile filter over the Western region of the Elk City field, Oklahoma.

FIG. 12 is an example of reinterpretation of original data obtained over the Elk City field, Beckham County, Oklahoma. Two sets of original data were available for this study; one that had been flown by the USGS probably within the period of 1947 – 1948 when the field was in its early development, and the other which was flown during 1949 – 1950 when many oil wells had been completed. The later map was therefore affected by the presence of steel well-casing and by metallic surface equipment. The earlier map was used to remove this spurious effect in an empirical manner from the second aeromagnetic map believed to be more accurate.

The results of the application of filter OM4 of the data so corrected are shown in FIG. 12. This map is of special interest because it covers the area of the deepest well in the World, the Lone Star Gas - Baden No. 1; as shown, it is evident that this well is not in a favorable area. In fact, all of the dry holes shown are in unfavorable magneto-electric areas as far as finding oil and gas is concerned. The GHK well, scheduled for a depth of 26,000 feet, has not reached total depth, but it is located on the edge of a favorable area and may well encounter production. The development wells of the Elk City field check reasonably well the predictions that would have been made by means of the OM4 filter prior to drilling.

Magneto-electric surveys were made over fifteen hundred square miles of airborne magnetometer map within the western Anadarko basin in order to evaluate this exploration method. As a result, the surveyed area is divided into two regions, a favorable and an unfavorable one. A total of 240 wells have now been drilled in the total area, 140 of which are in the favorable area and of which 105 wells produce either oil or gas, or both. The predicted success ratio is therefore 75% in the favorable areas compared to 59% by combined conventional geology-geophysics. Some producing wells were drilled in the non-favorable areas, but the success ratio there was only 38%. These observations must be considered as statistical proof of the existence of the magneto-electric effect of oil and gas fields.

2. Intentional Magneto-electric Surveys

Figure 9:
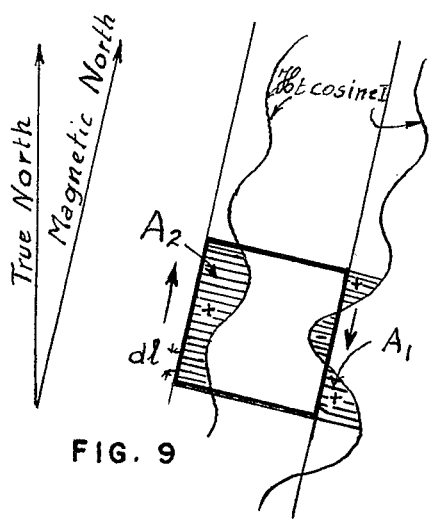
FIG. 9 illustrates a simple manner by which clockwise line-integrals around a unit-grid of a magnetic survey of the total magnetic field may be evaluated.

It is of course desirable to carry-out Magneto-electric surveys with the intention of measuring only the magneto-electric effect of oil and/or gas fields, other minerals, or geothermal energy deposits to the exclusion of other effects which are considered disturbing, in order to achieve the set goal of finding such deposits in the earth by sensing the electro-telluric currents which they generate. The objective of such field surveys is to measure directly the line integral segments such as shown in FIG. 9 as $A_1$ and $A_2$, from a continuously measuring instrument which is directionally sensitive such as the flux-gate magnetometer. To this end the instrument must be maintained horizontal throughout the survey and pointed at all times in the direction of travel. The output of the device may be digitally recorded on tape and it may also be recorded by an analog instrument. The data acquisition instrumentation is so designed as to integrate the readings continuously along the path of travel. An operator that observes the position of the surveying instrument at all times may punch a marker when the instrument reaches the corner of a grid such as the intersection of roads in sectionized territories. The flux-gate magnetic sensor may be mounted on a non-magnetic (aluminum) trailer some 50 to 60 feet behind a surveying vehicle, or it may be trailed on a cable from an airplane or helicopter, or it may be trailed in water for marine surveys. Such surveying instruments exist commercially that will maintain the sensor satisfactorily oriented in a horizontal position and in the travel direction.

However, the field operations and the processing of the data are greatly simplified when it may be assumed that, in in the area under investigation, the angles of magnetic inclination from horizontal and of declination from the true North remain substantially constant as is the case in sedimentary basins containing rocks of low magnetic susceptibility, which are also the geologic basins in which oil and gas fields are found. Accordingly, field magneto-electric surveys may be made using atomic precession magnetometers such as the proton, cesium vapor, and other such instruments that measure the magnitude of the total earth magnetic field vector, but not its direction. Such magnetometers are available for use on land, airborne or below sea level as well as for spot measurements or for continuous recording. The magnitudes of the horizontal magnetic components are obtained by multiplying the recorded values by cosine I, where I is the angle of inclination of the total magnetic vector from the horizontal as known from magnetic maps.

Figure 13:
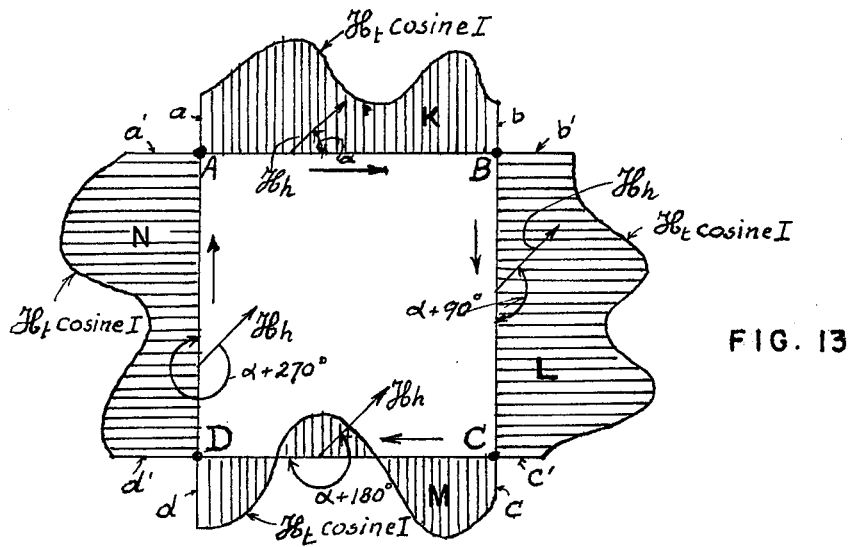
FIG. 13 shows how to perform a line integral of the total earth magnetic field around a closed grid loop and around which the total earth magnetic field has been recorded in a continuous manner.

In the practice of Magneto-electric surveys, the problem of diurnal variations and of reduction of the data to a base station does not exist as may be seen from FIG. 13 which represents a unit area ABCD of the square grid pattern. Each side of the square may have been surveyed at different times such that the horizontal magnetic field intensities at the various corners are given by the lower case letters in parentheses: $A(a \neq a')$, $B(b \neq b')$, $C(c \neq c')$ and $D(d \neq d')$. Since each side of the square was surveyed rather rapidly it is not necessary to make diurnal variation corrections such as might be thought to exist between $a$ and $b$, $b$ and $c$, $c$ and $d$, $d$ and $a$, because the travel distance is surveyed before an appreciable diurnal change takes place, provided there is no magnetic storm during the measurements along this path.

Let the integrals:

$$K = \int_A^B \vec{H_h} \cdot dl$$

$$L = \int_B^C \vec{H_h} \cdot dl$$

$$M = \int_C^D \vec{H_h} \cdot dl$$

$$N = \int_D^A \vec{H_h} \cdot dl$$

where the dots represent scalar products between the horizontal magnetic field intensity $\vec{H_h}$ and the the elementary travel vector $dl$. The values K and M, and L and N are of the same polarity when measured in the same direction; they are opposite in sign when the travel paths are opposite in direction.

The integral values K, L, M, N are measures of the areas shown on FIG. 13 obtained from the recorded values of $\vec{H_t}$ · cosine I without giving consideration to sign nor to normalization. Because of variation between the measurements at a particular point such as at corner A, it is necessary to normalize the values according to the recorded magnitude of $\vec{H_t}$ at each of the corners. Such values are given as $a$ and $a'$ at A, $b$ and $b'$ at B, $c$ and $c'$ at C, and $d$ and $d'$ at D, where the "prime" values are read in the E - W direction and the non-primed values were surveyed in the N - S direction. In order to evaluate the closed line-integral of the intensity of the horizontal component $\vec{H_h}$, which makes an angle $\alpha$ with the E - W direction, it is necessary to normalize the readings to an amplitude such as $a$ at corner A. Then, the value of the line-integral (LI) taken clockwise around the unit square of FIG. 13 is given by $$LI = K \text{ cosine } \alpha + L \cdot \frac{b}{b'} \text{cosine } (\alpha+90°)$$

$$+ M \cdot \frac{b}{b'} \cdot \frac{c}{c'} \text{cosine } (\alpha+180°) + N \frac{a}{a'} \text{cosine } (\alpha+270°)$$

The value of LI is then spotted at the center of the square ABCD for eventual contouring and interpretation when a number of such adjacent unit squares have been surveyed.

It is to be observed that the above calculations are all the reductions for diurnal variations which it is necessary to make. Measurements made at any other time will give the same LI readings. The only requirement is that the path of travel and measurement along each side of a unit square be made as rapidly as possible before any appreciable daily variations take place. It is not necessary to reduce readings to a base station value because each LI value is independently arrived at regardless of what the base station variations may be.

Therefore, a magneto-electric survey may be run by recording along extensive parallel profiles in one direction; then by recording at right angle along parallel intersecting profiles of equal spacing so as to obtain a grid of substantially uniform spacing. Calculations such as indicated in FIG. 13 are performed for every unit cell in the grid and the values of the closed line integrals are recorded in the center of each unit square. These values are then contoured either manually or by computer plotting and contouring routines.

The map so obtained represents the vertical electro-telluric current distribution in the earth within a layer approximately one mile in depth when the unit grid at the earth surface is 1 mile. If one wishes to obtain the electro-telluric current distribution at greater depth, such as within a 2 mile thick layer, the line integrals of four adjacent unit squares are added, allowing for their sign, and the results are optionally normalized to a one square mile area by dividing by 4. Then, the values are plotted at the center of the four units. This type of calculation is carried-out for all adjacent four unit cells in order to obtain a map that projects the anomalies in electro-telluric current distribution 2 miles in depth.

This process may be repeated in order to obtain maps of the electro-telluric current distribution to greater and greater depths in order to eventually delineate and separate the oil and gas accumulations at their respective depths. A certain degree of depth control is therefore possible in Magneto-electric exploration, the vertical resolution of the downward projection process being of the order of magnitude of the surface survey's grid mesh.

In field Magneto-electric surveys where the total or the horizontal magnetic field intensities are recorded continuously and where there is no obstacle to establishing traverses parallel to each other in the direction of the magnetic North-South axis, such as is the case for airborne surveys, at sea and over lakes and in desert regions, actual field operations, data processing and interpretation are greatly simplified, because then traverses need not be measured in the magnetic East-West direction since the line integrals along the East-West segments are always zero, the vector $\vec{H_h}$ being always at 90° to the East-West travel direction.

In the practice of Projective Well Log Interpretation and of the confirmation of the results by Magneto-electric surveys, it has been observed that fuel cells of different polarities, intensities and areal extent may be superimposed over each other and it may be desirable to probe the polarity, intensity and areal extent of the associated electro-telluric currents at a particular depth range or interval where a significant fuel cell may be expected. This appears particularly desirable when probing the earth for vapor dominated geothermal energy resources as such deposits are known to create electro-telluric vortices that are limited to the volume of rocks within which refluxing of steam under pressure forms large vertical upward convection currents of steam in the central area of the deposits and downward convection currents of condensed hot water on the outside of the geothermal deposits. By performing two magneto-electric surveys of grid-mesh sizes that enclose two different unit areas and the square roots of which areas give the depth of investigation of each survey, it is possible to ascertain the differential change in the intensity, polarity and areal extent of the fuel cell within a depth interval bracketed by the two probing investigation depths.

Another satisfactory procedure by which our invention may be practiced is by making spot magnetic field intensity measurements at discrete and selected ground stations. Such a procedure is especially suitable in difficult terrain not otherwise accessible by motor vehicle or where a prospect is of such limited areal extent that the cost of magnetic air-borne surveys or of continuous profiling would be prohibitive. For the purpose of carrying-out our invention by means of spot measurements, various types of portable field magnetometers are commercially available. Suitable instruments for the purpose are of two types: those that measure the total magnetic field intensity and those that measure only one or more components. For the purpose of our invention the only magnetic component of interest is the horizontal, because this is the one that will be integrated at the surface of the earth around closed profiles, traverses, or perimeters within the area under investigation.

Magnetometers that measure the total earth magnetic field are of the proton precession type; they afford an extremely precise method of measuring the earth magnetic field. If the area under investigation is not very extensive, i.e., not more than 10 by 10 miles, it may be assumed that the inclination (I) of the total earth magnetic vector from the horizontal plane remains fairly constant. If in addition, the area under study is made up of sedimentary rocks, the earth total magnetic field vectors will remain substantially parallel to each other within the restricted area under investigation. Under such conditions it may be expected that the horizontal component of the earth magnetic field will always point substantially northward in the northern hemisphere. Hence, the horizontal component may be computed from $\vec{H}_t \cdot$ cosine I where $\vec{H}_t$ is the value of the total earth magnetic field vector and I is its angle of inclination measured from the horizontal plane. It is the value of $\vec{H}_t \cdot$ cosine I that is to be integrated around closed profiles according to the procedure to be described.

Magnetometers that measure the horizontal component of the earth magnetic field are not as readily available commercially as for the total field measurements and those available are rather slow and cumbersome to use. The applicants, therefore, designed their own instrument according to the schematic drawing of FIG. 14. The basic principle of the measurements revolves around measuring the electric current intensity required to null the horizontal earth field component at the center of two Helmholtz coils 1, where a flux-gate sensor 2 is located, the nulling of the magnetic field being indicated by a zero reading at the Calex Model 70 instrument, 3. The required constant current through coils 1 is supplied by a 15.0 volt Ni-Cd battery, 4 through a Calex constant current device with required pin connector. The battery voltage is further stabilized by a Zener diode 6. A constant current is supplied through connector E. This current is divided through the 1400 ohm resistor 8 and the coil circuit that contains milliammeter 7 and a ten-turn wire wound potentiometer 9. The current required for nulling the field at the coils' center is read from a 10 turn Borg digital dial graduated from 0 to 999 fixed to the shaft of potentiometer 9. The Helmholtz coils are each 8 inches in diameter and they are 8 inches apart; each coil is wound with 200 turns of No. 22 enamel insulated magnet wire. When the coils are placed in series, a current of 27.2 milliamperes is required for nulling the horizontal component of the earth magnetic field in Austin, Tex. The sensitivity attainable with a ten turn digital dial potentiometer is 1 gamma per division (1 gamma = $10^{-5}$ Oersted). The Helmholtz coils are mounted vertically on a mounting non-magnetic platform which may be levelled when placed on a plane-table. The axes of the Helmholtz coils and of the flux-gate magnetic sensor coincide in space and in direction. The steps required for making field measurements are as follows:

1. Set up the tripod and plane-table level, place the instrument on the table and level it accurately and orient it in the East-West direction which will be indicated by a zero reading on the M70 instrument. Record this East-West direction of the instrument by drawing a reference line along its base. A magnetic North-South reference line may also be drawn by means of a Brunton compass.

2. Turn the instrument at 90° from the said reference and readjust leveling if necessary. Note reading on digital dial 9.

3. Apply measuring current by turning on switch No. 11. With the ten-turn digital dial 9 adjust measuring current so that the reading on the M70 instrument is again zero. The difference between the two dial readings multiplied by the sensitivity gives the difference in the horizontal magnetic field intensities between two stations ($\Delta H_h$), assuming that the digital dial reading under step 2 was that at the preceding station.

4. Turn off the M70 instrument and move to the next measuring station.

5. A succession of measuring stations are occupied in this manner until readings have been completed around a closed profile, the station at the beginning of the traverse being remeasured, thus making it a base station in order to determine the existence and magnitude of possible drift. If such a drift exists, it is removed proportionately from each station by plotting the readings on a cartesian cross-section graph paper versus the time of day at which the readings were made and drawing a straight line between the readings at the base station and measuring the departures ($\Delta \vec{H}_h$) between the plotted points at each station and the straight line. It is advisable to make readings at the base station about five times per day.

6. The corrected readings are now used on a map of the surveyed area by plotting the ($\Delta \vec{H}_h$) deviations obtained in step 5 in gammas (i.e., in magnitude to a selected scale, in the North direction for positive deviations and in the South direction for negative deviations).

7. The various measuring stations on a closed traverse are then joined by straight line segments on a map of the area under investigation and the angles ($\alpha$) made between the North direction and the direction of the said segments are measured.

8. The line-integral (LI) around a closed traverse is obtained by making the following algebraic sum:

$$LI = \sum_{1 \to 2}^{n \to 1} \frac{\Delta H_i + \Delta H_{i+1}}{2} \cdot ds \cdot \text{cosine } \alpha$$

where $ds$ is the distance in miles between two adjacent stations: $i$ and $i+1$, and $n$ is the total number of stations in the profile. The value of LI is expressed in gamma × mile.

9. The vertical electro-telluric current flux density ($i$) through the horizontal area enclosed by the traverse is calculated by Gauss' theorem is amperes by $i =$ 1.28 (LI) and the electro-telluric current flux is measured substantially at a depth equal to the square root of the area enclosed by the traverse.

By repeating such line-integral measurements along adjacent or overlapping closed traverses and by selecting the various traverses so that they will enclose successively and substantially the same area magnitude, it is possible to map the vertical flux of the electro-telluric currents in intensity and in direction at a substantially constant depth of investigation and thereby determine the boundaries of the subsurface accumulations of oil and/or gas, of other mineral deposits, and of geothermal steam energy deposits, the boundaries of said accumulations being indicated at the reversal in electro-telluric current flux or by the zero line of the contoured data.

Figure 14:
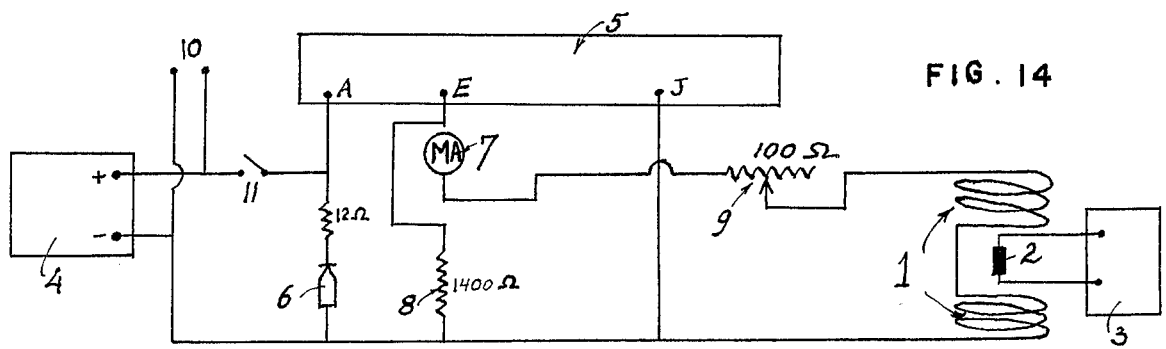
FIG. 14 is a schematic wiring diagram of a portable field magnetometer designed for measuring the variations of the horizontal earth magnetic field intensity in magnitude and in direction at stations selected for a Magneto-electric survey.
Figure 15:
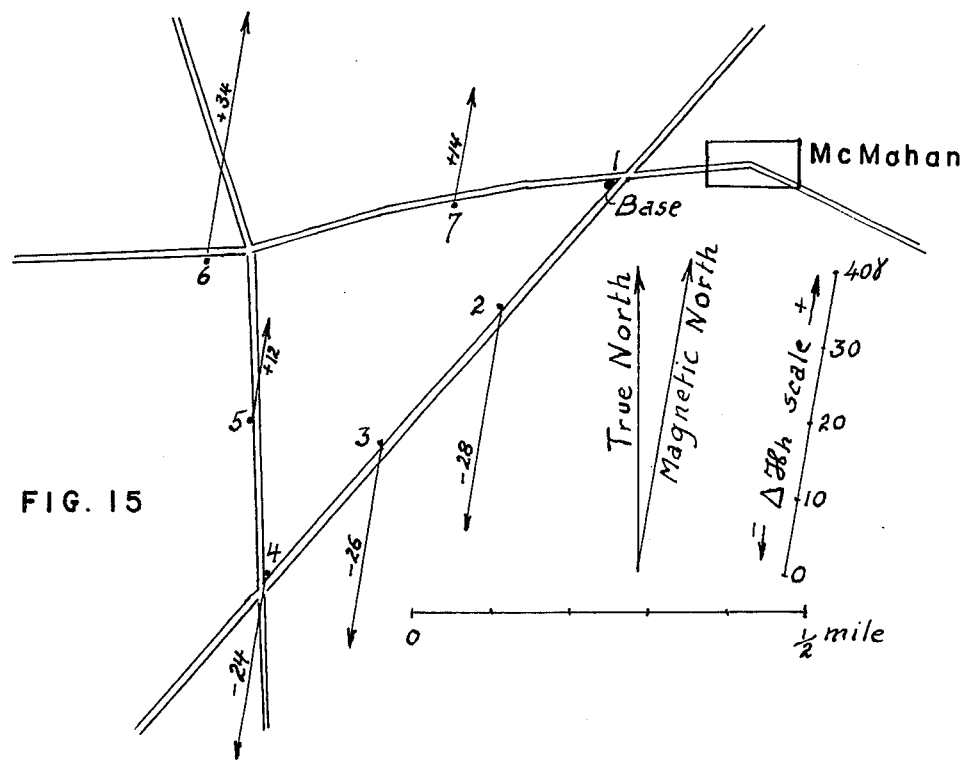
FIG. 15 shows the results of a Magneto-electric survey made with the instrument described in FIG. 14 over the McMahan prospect, Texas.

FIG. 15 shows the results of a Magneto-electric survey made with the instrumentation described in FIG. 14 over a portion of the McMahan prospect, Texas. This part of the prospect shows a well established electro-telluric downward current flux to be 16.2 amperes through the enclosed area of approximately 100 acres. The magneto-electric effect calculated by the method of line integration just explained and using the measured magnetic anomaly vectors as shown on FIG. 15 computes to be 16.3 γ · miles. Using the formula shown under step 9 above, a vertical downward electro-telluric current of 20.9 amperes is obtained.

Figure 16:
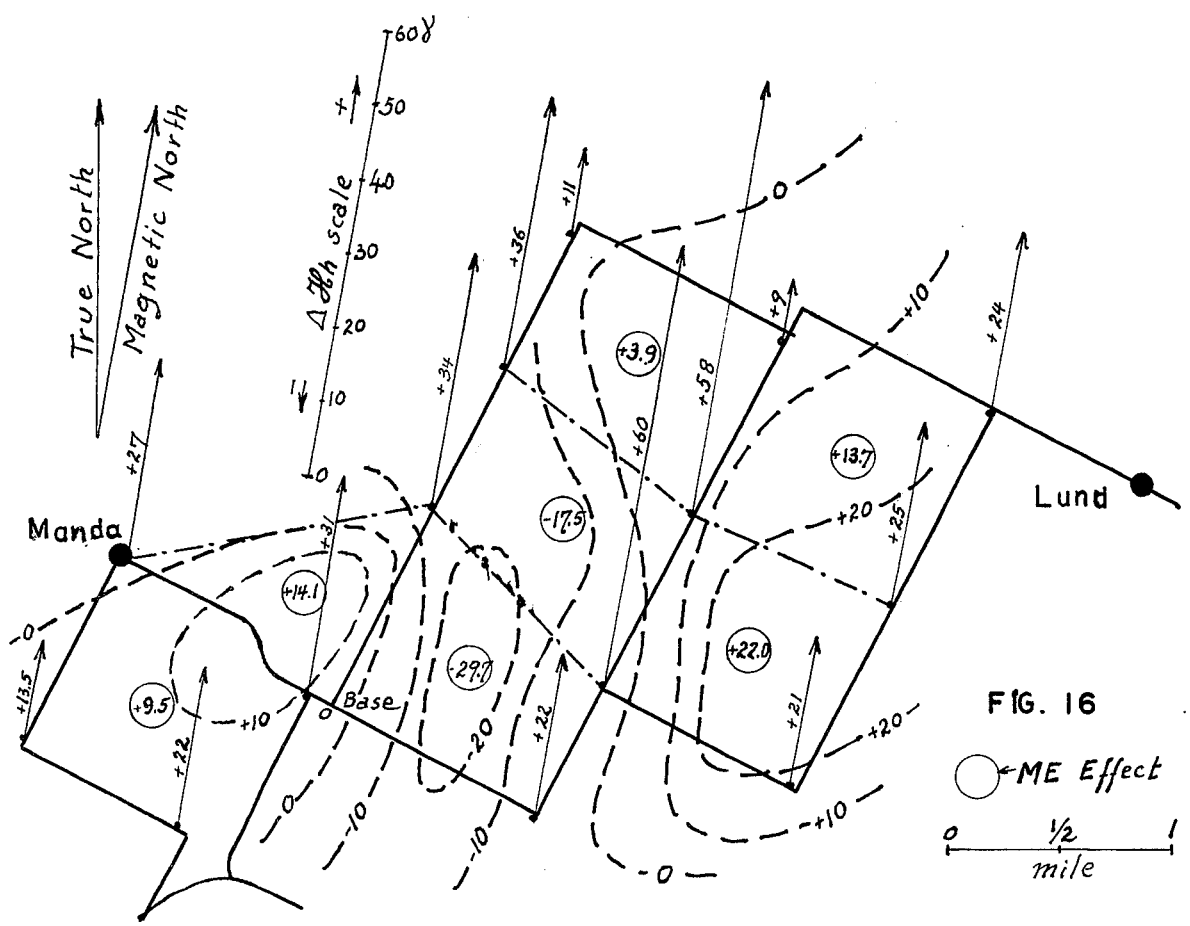
FIG. 16 shows the results of a Magneto-electric survey made with the instrument described in FIG. 14 over the Manda-Lund prospect, Texas.

Considering the nature of the problem and the assumptions that had to be made, the current flux calculated from the two surveys must be considered as satisfactory and also to be a justification of the two methods of exploration, namely by Magneto-electric means and by Electro-telluric means. On a per acre basis, the current fluxes are respectively 162 and 209 milliamperes per acre, which figures correspond adequately in magnitude with those derived from the electric well logs of FIG. 7 from which a current flux of 53 milliamperes per acre is derived. Although this derivation was made in another geologic province, over and in the vicinity of a known oil field, the result show nevertheless the magnitude of electro-telluric current fluxes to be expected in order to be significant of the presence of oil and gas in commercail quantities FIG. 16 shows the results of another magneto-electric survey over a portion of the Manda-Lund prospect, Texas, made with the instrumentation described in FIG. 14. This survey is composed of three closed traverses represented by solid lines along which the measuring stations are indicated and at which the deviations in the horizontal magnetic field intensities, in magnitude and in sign, are represented by scaled vectors parallel to the direction of the magnetic North. Line integrals along closed profiles that comprise part of the solid line real traverses and part of the dashed line imaginary traverses were computed and the values of LI so obtained are spotted as near as possible to the center of gravity of the areas enclosed by the traverses; then the values were contoured so as to delineate probable oil and gas production by the zero line. Accordingly, the depth of expected production is about 3000 to 4000 feet, which would place it in the Glen Rose or Sligo formations.

Having described and illustrated the present invention, it is recognized that numerous modifications and variations will occur to one skilled in the art without departing from the basic invention involved herein. It is further understood, of course, that the method and apparatus herein illustrated and described are intended to be representative only, as certain changes may be made therein without departing from the clear teachings of the disclosure. It is also understood that the examples given, the apparatus illustrated and described are all by way of illustration and are intended only to examplify the principles of the invention to one skilled in the art. Therefore, with this in mind, the present invention is to be limited only in accordance with the appended claims which determine the full scope of the invention.

We claim:

1. A method of locating oil, gas, minerals, or geothermal energy deposits comprising the steps of:
   a. measuring the total earth magnetic field intensity $\vec{H}_t$ at a plurality of stations numbered from 1 to $n$ and forming a closed traverse around an area to be investigated
   b. evaluating the line-integral LI defined by $$LI = \sum_{1 \to 2}^{n \to 1} \vec{H}_t \cdot ds \cdot \text{cosine } \alpha$$

along said traverse, wherein $ds$ is an elementary length of the traverse, $\alpha$ is the angle between $\vec{H}_t$ and $ds$ and $$\sum_{1-2}^{n-1}$$

denotes the algebraic summation of $n$ terms of the form $\vec{H}_t \cdot ds \cdot$ cosine $\alpha$ evaluated in the series of intervals 1–2, 2–3, . . . . ($n$–1)–$n$, $n$–1, c. correlating the value of LI to the presence or absence of the deposits sought on the basis of its magnitude and its sign, positive values of LI evaluated along the closed traverses in a clockwise direction are indicative of mineral deposits giving rise to downward electro-telluric current flow such as are generated by hydrocarbon accumulations, whereas negative values of LI are indicative of the presence of mineral deposits giving rise to upward electro-telluric currents such as are generated by geothermal energy, the aforesaid relationship between the polarity of LI and the electrotelluric current flow direction being reversed when the line integration is performed counterclockwise.

2. The method of claim 1, in which:
   a. the horizontal component of the earth magnetic field is measured and a line integration of said component is performed around a closed traverse.

3. A method of locating oil, gas, minerals, or geothermal energy deposits comprising the steps of:

a. selecting a plurality of adjacent or over-lapping closed traverses enclosing areas to be investigated, preferably all substantially of the same area-magnitude
b. measuring the total earth magnetic field intensity $\vec{H_t}$ at a plurality of stations numbered from 1 to $n$ along each closed traverse
c. evaluating the line integral LI defined by $$LI = \sum_{1 \to 2}^{n \to 1} \vec{H_t} \cdot d\vec{s} \cdot \text{cosine } \alpha$$

around each of the closed traverse, wherein $ds$ is an elementary length of the profile, $\alpha$ is the angle between $\vec{H_t}$ and $d\vec{s}$, and $$\sum_{1-2}^{n-1}$$

denotes the algebraic summation of $n$ terms of the form $\vec{H_t}.d\vec{s}$:cosine $\alpha$ evaluated in the series of intervals 1–2, 2–3, . . . . . (n–1)–n, n–1,
d. plotting the values of LI so obtained at the center of each of the areas surveyed for the purpose of evaluating the presence and the areal extent of the deposits sought, positive values of LI evaluated along the closed traverses in a clockwise direction are indicative of mineral deposits giving rise to upward electrotelluric currents such as are generated by geothermal energy, the aforesaid relationship between the polarity of LI and the electrotelluric current flow direction being reversed when the line integration is performed counterclockwise.

4. The method of claim 3, in which:
a. the horizontal component of the earth magnetic field is measured along a plurality of adjacent or overlapping closed traverses.

5. A method of locating oil, gas, minerals, or geothermal energy deposits comprising the steps of:
a. selecting a plurality of long and substantially parallel traverses all oriented in the same direction and another plurality of such traverses intersecting the first set of traverses substantially at right angle and covering an area under investigation
b. recording continuously along such traverses the total intensity $\vec{H_t}$ of the earth magnetic field
c. evaluating the line integral segment $$LI = \int \vec{H_t} \cdot d\vec{s} \cdot \text{cosine } \alpha$$

along each intercept between the two groups of traverses, wherein $ds$ is an elementary length of the traverse, $\alpha$ is the angle between $\vec{H_t}$ and $ds$ and $ds$ and $$\sum_{1-2}^{n-1}$$

denotes the algebraic summation of $n$ terms of the form $\vec{H_t}.d\vec{s}$.cosine $\alpha$ evaluated in series of intervals 1-2, 2-3, . . . . (n-1)-n, n-1
d. evaluating the closed line integrals $LI_c$ around each mesh grid formed by the two groups of traverses by adding algebraically the four LI's values around each grid
e. plotting the values of $LI_c$ so obtained at the centers of each of the mesh grid for the purpose of evaluating the presence and the areal extent of the deposits sought, positive values of LI evaluated along the closed traverses in a clockwise direction are indicative of mineral deposits giving rise to downward flow of electrotelluric currents such as are generated by hydrocarbon accumulations, whereas negative values of LI are upward electrotelluric currents such as are generated by geothermal energy, the aforesaid relationship between the polarity of LI and the electrotelluric current flow direction being reversed when the line integration is performed counterclockwise.

6. The method of claim 5, in which:
a. the horizontal component of the earth magnetic field is measured.

7. A method of locating oil, gas, minerals, or geothermal energy deposits by intepreting maps of the total earth magnetic field intensity comprising the steps of:
a. gridding the area of interest on such maps and reading the magnetic field values A at each grid apex
b. transferring said values to computer cards or to magnetic tape for computer processing
c. evaluating the line integrals LI (I, J) around each four mesh grid by $$LI (I, J) = A (I, J+1) + A (I, J+2) + A (I, J+3) + A (I, J+4) + A (I+2,2, 4) + A (I+3, J+4) - A (I+4, J+3) - A (I+4, J+2) - A (I+4, J+1) - A (I+3, J) - A (I+2, J) - A (I+1, J) - 3.0 [A (I, J+4) - A (I+4, J)]$$

wherein A is the total earth magnetic field intensity at points of row number values I to I + 4 and of column number values J to J + 4.
d. plotting the values of LI so obtained at the center of each of the mesh grid for the purpose of evaluating the presence and the areal extent of the deposits sought.

8. The method of claim 7, in which:
a. the horizontal component of the earth magnetic field is measured.

9. The method of claim 7, in which the line integral LI around each four mesh grid is evaluated by
a. computing the curvature D (I, J) of the readings A by:

$$D (I, J) = 2.0A (I+1, J+1) - [A (I, J) + A (I, J+1) + A (I, J+2) + A (I+1, J) + A (I+2, J) + A (I+2, J+1) + A (I+2, J+2) + A (I+1, J+2) + A (I+1, J+1)] 1 \, 3.0$$

b. computing the line integrals LI (I+1, J+1) around each four mesh grid by:

$$LI (I+1, J+1) = D (I, J+1) + D (I+1, J+2) + D (I+2, J+1) + D (I+1, J) - D (I, J) - D (I, J+2) - D (I+2, J+2) - D (I+2, J)$$

wherein $A$ is the total earth magnetic field intensity and $D$ is the curvature of a surface defined by the $A$ values, the numerical values of $A$ and $D$ being represented at points of coordinates of row number values $I$ to $I + 2$ and of column number values $J$ to $J + 2$.

10. The method of claim 9, in which:
a. the horizontal component of the earth magnetic field is measured.

11. The method of claim 5, in which:

a. a single plurality of long and substantially parallel traverses are selected all in the magnetic North-South direction
b. the line integral of the total earth magnetic field intensity is evaluated along equal segments on two adjacent sides of mesh grids along the said traverses.

12. The method of claim 11, in which:
a. the horizontal component of the earth magnetic field is measured.

13. The method of locating oil, gas, minerals and geothermal energy deposits comprising the steps of:
a. measuring the total earth magnetic field intensity at a plurality of stations numbered from 1 to $n$ along a first closed traverse in an area to be investigated and at another plurality of stations numbered from 1 to $m$ along a second closed traverse in the same area and enclosing the said first traverse, totally or partially
b. evaluating the line integrals $$LI_1 = \sum_{1-2}^{n-1} \vec{H_{t_1}} \cdot ds_1 \cdot \text{cosine } \alpha_1$$

and $$LI_2 = \sum_{1-2}^{m-1} \vec{H_{t_2}} \cdot ds_2 \cdot \text{cosine } \alpha_2$$

along each of said traverse, wherein $LI_1$ is the line integral evaluated along the first closed traverse comprising stations numbered 1 to $n$, $$\sum_{1-2}^{n-1}$$

denoting the algebraic sum of terms $\vec{H_t}.ds.\text{cosine } \alpha$, $\vec{H_t}$ being the total earth magnetic field intensity measured at stations 1 to $n$, $ds$, is an elementary length of this traverse and $\alpha$, is the angle between $\vec{H_t}$ and $ds$, whereas $LI_2$ is the line integral along the second closed traverse comprising stations numbered 1 to $m$ and performed in the same manner and in the same direction as $LI_1$
c. evaluating the difference $LI_1 - LI_2$ in intensity and in polarity in order to determine the differential change in the electro-telluric currents within the depth interval bracketed by the depths of investigation of each closed profile.

14. The method of claim 13, in which
a. the horizontal component of the earth magnetic field is measured.

* * * * *

UNITED STATES PATENT OFFICE
CERTIFICATE OF CORRECTION

Patent No. 3,943,436          Dated March 9, 1976

Inventor(s) Sylvain J. Pirson; Jacques E. Pirson

It is certified that error appears in the above-identified patent and that said Letters Patent are hereby corrected as shown below:

In the Abstract: line 13, replace "so" by do
Column 2, line 6, replace "maker" by marker
" 2, line 52, replace "napping" by mapping
" 2, line 64, replace "Mangeto" by Magneto
" 5, line 21, replace "energyy" by energy
" 5, line 32, replace "bracketted" by bracketed
" 14, line 66, replace "ite" by it
" 15, line 12, replace "oill" by oil
" 16, line 25, before "represents" insert $\int ds$
" 18, line 7, replace "is" by in
" 18, line 32, replace "doind" by doing
" 21, line 26, cancel one "the"
" 27, line 55, cancel one "and ds"
" 28, line 9, after "are" insert indicative of
" 28, 2nd line of formula line 30, replace "2,4" by J + 4
" 28, last line of formula line 50, before 3.0 replace "1" by /
" 27, line 24, replace ":" by .

Signed and Sealed this

Twenty-fourth Day of August 1976

[SEAL]

Attest:

RUTH C. MASON          C. MARSHALL DANN
*Attesting Officer*          *Commissioner of Patents and Trademarks*